US006446896B1

(12) United States Patent
Shima et al.

(10) Patent No.: US 6,446,896 B1
(45) Date of Patent: Sep. 10, 2002

(54) TAPE CASSETTE

(75) Inventors: Motohiko Shima; Hiroshi Kaneda; Masatoshi Okamura; Akio Momoi; Kenji Hashizume, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/439,095

(22) Filed: Nov. 12, 1999

(30) Foreign Application Priority Data

| Nov. 19, 1998 | (JP) | 10-329201 |
| Dec. 24, 1998 | (JP) | 10-367001 |
| Jan. 8, 1999 | (JP) | 11-002868 |
| Jan. 14, 1999 | (JP) | 11-007663 |

(51) Int. Cl.⁷ ............................................. G03B 23/02
(52) U.S. Cl. .............................. 242/343.2; 242/338.3; 360/132
(58) Field of Search ................... 242/343, 343.1, 242/343.2, 338.1, 338.2, 338.3; 360/132

(56) References Cited

U.S. PATENT DOCUMENTS

| 4,585,187 A | | 4/1986 | Okamura et al. | |
| 4,631,619 A | | 12/1986 | Hashizume et al. | |
| 4,739,949 A | * | 4/1988 | Lin | 360/132 X |
| 4,903,915 A | * | 2/1990 | Iwahashi | 360/132 X |
| 5,056,735 A | * | 10/1991 | Gelardi et al. | 360/132 X |
| 5,433,398 A | * | 7/1995 | Sawada | 242/343.2 |
| 5,435,498 A | * | 7/1995 | Makino | 242/343.2 |
| 5,449,124 A | * | 9/1995 | Fujii | 242/338.3 |
| 5,505,397 A | * | 4/1996 | Goff et al. | 242/338.3 |
| 5,506,739 A | * | 4/1996 | Iwahashi | 360/132 |
| 5,622,325 A | * | 4/1997 | Taguchi | 242/343 |
| 5,730,381 A | * | 3/1998 | Yamada et al. | 242/343 |
| 5,860,611 A | * | 1/1999 | Ikebe et al. | 242/343 |
| 5,899,400 A | * | 5/1999 | Yamada et al. | 242/343.2 |

FOREIGN PATENT DOCUMENTS

| DE | 196 10 525 | 9/1996 |
| EP | 0 146 311 | 6/1985 |
| EP | 0 335 549 | 10/1989 |
| GB | 2 192 610 | 1/1988 |
| JP | 58-173073 | 11/1983 |
| JP | 3-106587 | 11/1991 |
| JP | 4-241284 | 8/1992 |
| JP | 6-318383 | 11/1994 |
| JP | 10-112158 | 4/1998 |
| WO | WO 99/24986 | 5/1999 |

* cited by examiner

Primary Examiner—William A. Rivera
(74) Attorney, Agent, or Firm—Oblon, Spivak, McClelland, Maier & Neustadt, P.C.

(57) ABSTRACT

In a tape cassette, a reel brake member has an opening hole portion for insertion of a brake release member on a device side, and a guide recessed portion for guiding the brake release member is formed in a central portion of an abutment side wall portion of the brake release member in the opening hole portion. This guide recessed portion is formed in the abutment side wall portion of the brake release member in a vertical direction in a central portion of the opening hole portion, and an internal surface of the guide recessed portion is formed into a U-shaped groove having a curved surface. Arms are provided on sides of a main body of a reel brake member via hinge portions, and a brake pawl is provided at a distal end of the respective brake pawls. An opening hole is formed for insertion of a brake release operation member provided on a device side. In addition, upper surface portion and lower surface portion are provided which are adapted to abut with and slide over internal surfaces of upper and lower cases. Recessed portions are provided on the upper surface portion on both sides of a front side at positions corresponding to outer circumferential edges of the tape reels, and a butt recessed portion is provided on a front side of the lower surface portion so as to correspond to holding ribs provided along tape reel receiving areas on a front side of a reel brake sliding area.

7 Claims, 36 Drawing Sheets

TAPE CASSETTE

BACKGROUND OF THE INVENTION

The present invention relates to a tape cassette for use in a magnetic recording and reproducing device such as a video tape recorder (VTR) and more particularly to a tape cassette for use as a video tape cassette such as an 8 mm video tape cassette and a digital video cassette (DVC) which has a tape-like medium received in a case thereof via tape reels and incorporates therein a reel brake mechanism for regulating the rotation of the tape reels when the tape cassette is not in use.

Conventionally, in a tape cassette in which a pair of tape reels around which a tape-like medium is wound are rotatably installed in a case thereof, a brake mechanism for stopping the rotation of the tape reels when the tape cassette is not in use is widely used which is constructed such that a brake member is biased against teeth provided on outer circumferences of flanges of the tape reels by means of a resilient member such as a torsional coil spring and a leaf spring, and when this tape cassette so constructed is mounted in the recording and reproducing device, a brake releasing member of the recording and reproducing device is brought into abutment with the brake member and moves the brake member against the resilient force of the spring so as to disengage the brake member from the tape reels to thereby allow the tape reels to rotate (Japanese Unexamined Patent Publication Nos. 6-318383 and 10-112158, and Japanese Unexamined Utility Model Publication Nos. 3-106587 and 58-173073).

FIGS. 31A and 31B are plan views showing one example of a conventional reel brake for a tape cassette, FIG. 31A showing a state in which the reel brake is in normal use, and FIG. 31B showing a state in which pawls are deployed. Arms 826 are provided on left and right sides of a main body 821 of the reel brake 820 in such a manner as to outwardly protrude therefrom. This arm 826 and the pawl 822 are connected to each other at a thin hinge portion 824. The pawl 822 comprises a distal end portion 822a, a guided portion 822b and a root portion 822c which are integrally formed. The pawl 822 is formed so as to rotate about the hinge portion 824 as a fulcrum, and they are so constructed as to allow the pawl 822 to rotate appropriately when the distal end portion 822a of the pawl 822 is brought into engagement with teeth formed in a tape reel to thereby provide a smooth engagement between the pawl 822 and the teeth.

The reel brake 820 is disposed in the tape cassette in a state as shown in FIG. 31A, in which the guided portion 822b engages a guide groove formed on a case main body side.

In the aforesaid conventional reel brake for a tape cassette, however, a number of reel brakes are received as one of parts for a tape cassette in a box or the like for transportation after they are formed until they are incorporated into a tape cassette, and in assembling, they are put in volume in a part feeder or the like of an automatic assembling machine. During these stages, reel brakes 820 get entangled in each other, and as shown in FIG. 31B, the pawl 822 is unnecessarily rotated (excessive rotation), and moreover this repeatedly happens, since the thickness of the hinge portion 824 is extremely thin (e.g., on the order of 0.13 mm), there is caused a cut (crack) in the hinge portion 824 and there may be even a case where the hinge portion 824 is cut thereat.

In addition, when the reel brake 820 is used in a state in which there is cause to cut in the hinge portion 824, the hinge portion 824 is cut while in use, thereby causing a problem that the reel brake 820 cannot fulfill the function to lock the tape reels.

Furthermore, although the strength of the hinge portion 824 is improved if a resin material (for instance, polypropylene) is used which has a hinge effect strong enough to deal with repeated bending, since materials have to be selected while taking into consideration the moldability and slidability of the reel brake 820, there has been a certain limit to increasing the strength of the hinge portion 824.

FIGS. 32A and 32B shows an example of another conventional reel brake, in which FIG. 32A is a plan view showing a state in which a reel brake 908 mounted in a lower case 902 engages teeth 903d formed in a tape reel 903 and FIG. 32B is a sectional view corresponding to a plane A—A of FIG. 32A and showing a state in which an upper case 901 is mounted on the lower case 902.

The teeth 903d are formed in an outer circumference of the tape reel 903. In addition, in FIG. 32A, the reel brake 908 is disposed slidably in vertical directions. Pawls 908c are provided on left and right sides of a main body 908a of the reel brake 908, which pawls 908c are adapted to freely rotate via thinned hinge portions 908b.

The reel brake 908 is biased toward the tape reel 903 side by virtue of a spring force of a spring (not shown) when the tape cassette is not in use, and the tape reel 903 is locked when the pawl 908c of the reel brake 908 enters between the teeth 903d formed in the tape reel 903.

In addition, when the tape cassette is in use, the reel brake 908 is slid in a direction in which it moves away from the tape reel 903 against the biasing force of the spring, whereby the engagement between the reel brake 908 and the tape reel 903 is released.

Furthermore, a position regulating portion 902b, for regulating the position of the reel brake 908, is provided in the lower case 902 in such a manner as to be erect therefrom. A front of the main body 908a of the reel brake 908 and a position regulating wall 902b are constructed so as to be brought into abutment with each other at a position where a distal end of the pawl 908c of the reel brake 908 engages the teeth 903d of the reel brake 903, whereby the reel brake 908 is prevented from sliding further toward the tape reel 903 side from this regulated position.

In the conventional tape cassette, however, since a gate portion 908f exists in the front of the main body 908a of the reel brake 908, there is no problem caused when the gate portion 908f is flat, but as shown in FIGS. 32A and 32B, in a case where there remains a projection (the remains of the gate) at the gate portion 908f, there is caused a problem that the front of the main body 908a does not abut with the position regulating wall 902b, but only the gate portion 908a abuts therewith, and there may be caused a risk in which the reel brake 908 is not allowed to slide to an original engagement position where the reel brake 908 engages the teeth 903d of the tape reel 903.

Even if the distal end of the pawl 908c of the reel brake 908 engages the teeth 903d of the tape reel 903, the engagement therebetween becomes insufficient, and this causes a problem that the designed braking function cannot be securely performed.

Here, to deal with the aforesaid problem, first of all, it is considered to finish the gate after the reel brake 908 is formed such as by cutting a projection with a pair of nippers or grinding away the same with a file. However, a processing like this involves a problem of increased costs.

Secondly, it is considered to dispose the gate of the reel brake 908 at a position other than in the front of the main body 908a of the reel brake 908. However, upper and lower surfaces of the main body 908a of the reel brake 908 are brought into abutment with internal walls of the upper case 901 and the lower case 902 and constitute a sliding surface for the reel brake 908, and therefore if the gate portion 908f is provided in these surfaces, there may be caused a risk of a sliding failure, which is not preferable.

In addition, generally, the back of the main body 908a is a surface which is adapted to be brought into abutment with a spring for biasing the reel brake 908 and therefore, the configuration thereof becomes complicated, and it is not preferable to provide the gate portion 908f in this back. On the other hand, it is preferable to provide the gate portion 908f at a central portion of the front of the main body 908f of the reel brake 908 from the viewpoint of formability of the thinned hinge portion 908b for allowing the rotation of the pawl 908c. In other words, if the gate portion 908f is provided at a position offset either to the left-hand side or the right-hand side of the main body 908a, the formability of the thinned hinge portion 908b is deteriorated.

Thirdly, it is considered to lower the height of the position regulating wall 902b to a height where an abutment with the gate portion 908f can be avoided. However, in this case, there is caused a problem that the reel brake 908 is liable to fall forward when the reel brake 908 abuts with the position regulating wall 902b.

However, in recent years, as various types of recording and reproducing devices have been developed and marketed, brake release devices equipped on such devices or device side brake release devices have also been diversified. In a cassette tape having a reel brake member that is maneuvered, for instance, with a pin, the size and depth of openings formed in a lower case or on a lower surface side of a reel brake member are standardized, but in brake release members provided on a device side, there are pins of various configurations, such as square pole-like or cylindrical, and the thickness thereof also ranges from thin to thick. Also, the configuration of the tips of the pins range from slanted to spherical tips, so that the thickness and configuration appears to vary from manufacturer to manufacturer.

Namely, there are a number of designs adopted for the position and tip configuration of pins and they vary from model to model or from manufacturer to manufacturer. When a reel brake member retires to a standardized brake release position, if the position of a brake release pin is offset, or a pin is inclined, it is highly probable that a brake pawl continues to stay in the reel areas, and if this happens, there is caused a problem that the tape reel cannot rotate in a normal fashion.

In particular, in the case of a video camera, in order to cope with the tendency in which cameras are made smaller in size and lighter in weight, the number of thin pin-like members is being increased. In operation and maneuvering of this type of release pin, if there is caused relative deviation in position between the pin and the reel brake opening of a cassette, or, for instance, such a deviation in position is caused by the tolerance or variation in production of a cassette or variation in production of a device, it may be not possible to press the central portion of the reel brake member. In that case, since a force is caused to act on the reel brake member in a direction in which the member rotates, a great magnitude of force is required to release the brake, and therefore a smooth braking operation cannot be effected or depending on a device, the device may be out of order, this causing a problem in handling of the device.

SUMMARY OF THE INVENTION

Consequently, an object of the present invention is to prevent the generation of a cut in a thin hinge portion via which a pawl of a reel brake for a tape cassette becomes rotatable due to excessive rotations of the pawl, for instance, while being transported.

Therefore, an object of the present invention is to prevent an interference between the gate portion of the reel brake and the position regulating portion of the case main body while maintaining the formability of the reel brake.

The present invention was made to easily eliminate the aforesaid problems inherent in the prior art, and an object thereof is to provide at reasonable costs a tape cassette that can press for actuation a central portion of a reel brake member even if there are various types of reel brake members resulting from a variety of types of devices used together for a smooth brake releasing operation, which can maintain the normal brake function so as to eliminate a problem in handling for a secure brake operation and which incorporates therein a functionally satisfactory brake mechanism.

The present invention was made to easily eliminate the aforesaid problems inherent in the prior art, and an object thereof is to provide a tape cassette wherein a reel brake mechanism for stopping the rotation of a pair of tape reels rotatably received inside a case of the tape cassette is constructed such that even if a strong impact such as a drop impact is exerted thereon, a brake engagement is not released to thereby prevent the production of a looseness of the tape so that the tape cassette can perfectly be used, wherein the reel brake mechanism is constructed such that a reel brake member is prevented from being moved even if the tape reels are moved inside the tape cassette to thereby eliminate unnecessary movements of the reel brake member so that the reel brake member can follow every movement of the tape reels, thereby making it possible to maintain a highly reliable reel brake performance, and wherein the number of components used is reduced to as few as possible so as to improve the assembling capability and increase the productivity, thereby making it possible to provide an inexpensive tape cassette incorporating therein a reel brake mechanism that can perform a positive brake operation and which satisfies functional requirements.

With a view to attaining the aforesaid object, according to the first aspect of the invention, a tape cassette comprises a reel brake for a tape cassette, a pair of tape reels around which a tape is wound being rotatably received in a case main body so as to prevent idle rotations of the tape reels through engagement with the tape reels when the tape cassette is not in use, wherein the reel brake comprises pawls provided on a main body thereof and each having a thinned hinge portion, the pawl being formed so as to rotate through the hinge portion and comprising a regulating portion for preventing excessive rotations of the pawl.

Preferably, the regulating portion comprises a regulating rib provided so as to extend from the vicinity of the hinge portion, and wherein an end of the regulating rib is adapted to abut with an end of an arm located on an opposite side and connected to the rib via the hinge portion when the pawl rotates excessively.

Moreover, the regulating portion comprises a regulating rib provided between a pair of the hinge portions of the main body.

In the first aspect of the present invention, the pawl can rotate via the hinge portion, but when the pawl is rotated excessively, the pawl and the main body of the reel brake are brought into abutment with the regulating portion. Consequently, a further rotation of the pawl can be prevented, whereby even when reel brakes get entangled in each other to thereby rotate the pawls excessively, since a rotation of the pawl exceeding a certain angle is regulated by the regulating portion, the generation of a cut in the hinge portion can be prevented.

With a view to attaining the aforesaid object, according to the second aspect of the invention, a tape cassette comprises: tape reels around which a tape-like medium is wound after being rotatably received in a case main body; a reel brake, for preventing idle rotations of the tape reels, through engagement with the tape reels, when the tape cassette is not in use, the reel brake being slidably disposed between a locked or brake position, wherein the tape reels are locked or have a brake applied thereto, and a lock or brake releasing position, wherein the locking of or the brakes applied to the tape reels are released; and a position regulating portion provided in the case main body for regulating the position of the reel brake at a position where the reel brake locks the tape reels, wherein a gate portion for the reel brake is provided at a front of a main body of the reel brake, and wherein a run off portion is formed such that the gate portion formed at the front of the main body of the reel brake does not abut with the position regulating portion when the front of the main body of the reel brake is brought into abutment with the position regulating portion. Preferably, a runoff portion is formed in the position regulating portion for avoiding an abutment between the reel brake and the gate portion.

In the second aspect of the present invention, when the front of the main body of the reel brake abuts with the position regulating portion, the gate portion at the front of the main body of the reel brake does not abut with the position regulating portion. Therefore, even if there remains a projection (the remains of the gate) at the gate portion, the reel brake is allowed to slide to a position where the reel brake can be brought into secure abutment with the tape reels.

Moreover, the run off portion formed in the position regulating portion side functions to avoid a risk of an abutment between the gate portion of the reel brake and the position regulating portion. Therefore, there is no need to form a thickness saving portion or the like on the reel brake side.

According to the third aspect of the present invention, a tape cassette comprises a pair of tape reels around which a tape is wound rotatably received in a case, the tape being disposed so as to extend from one of the tape reels through a front of the case to the other tape reel to be wound up therearound, and a reel brake member having brake pawls for suppressing the rotation of the tape reels and provided so as to freely slide for engagement with and disengagement from teeth of the tape reels for braking operation and brake releasing operation, respectively, the reel brake member being biased by a spring toward a tape reels side, wherein a main body of the reel brake member comprises an opening hole portion for insertion of a brake release member provided on a device side, and wherein a guide recessed portion is formed at a center of an abutment side wall portion of the brake release member within the opening hole portion for guiding the brake release member.

In addition, the guide recessed portion is formed in a vertical direction in the abutment the wall portion of the brake release member at a central portion of the opening hole portion, and an internal surface of the guide recessed portion is formed into a curved surface.

Furthermore, the abutment side wall portion of the brake release member is formed into an inclined surface on a lower the thereof, while the abutment side wall portion is, formed into a vertical surface on an upper side thereof, and both sides of the guide recessed portion into which the brake release member is fittingly inserted are formed into flat surface portions.

According to a mode of operation of the present invention, in a case, a reel brake member biased by a resilient force so as to engage tape reels is restricted with respect to a movable range thereof by a regulating mechanism for preventing the movement of the reel brake member to such an extent that brake pawls of the reel brake member are released from an engagement with tape reels. In other words, the reel brake member comprises an opening hole portion for insertion of a brake release member provided on a device side, and a guide recessed portion is formed at a center of an abutment side wall portion of the brake release member within the opening hole portion for guiding the brake release member. With this construction, even if there is a change in the type of machine on the device side involving various types of brake release members, a central portion of the reel brake member can be pressed for operation at all times, whereby a smooth brake release operation can be effected, and the brake function can be maintained in a normal fashion, thus there being caused no problem in handling the same. In addition, in a brake release means for use with a recording and reproducing device, the main body of the reel brake member facing the opening of the case abuts with the brake release member to thereby cause the reel brake member to slid and move so that the brake pawls can securely be disengaged from the teeth of the brake potion for safety running of a tape inside.

According to the fourth aspect of the present invention, a tape cassette comprises a pair of tape reels around which a tape is wound rotatably received in a case, the tape being disposed so as to extend from one of the tape reels through a front of the case to the other tape reel to be wound up therearound, and a reel brake member having brake pawls for suppressing the rotation of the tape reels and provided so as to freely slide for engagement with and disengagement from teeth of the tape reels for braking operation and brake releasing operation, respectively, the reel brake member being biased by a spring toward a tape reels side, wherein a main body of the reel brake member comprises arms provided on sides thereof via hinge portions, each of the arms having a brake pawl provided on a distal end thereof, an opening hole portion formed therein for insertion of a brake release operating member provided on a device side, upper and lower surface portions adapted to abut with and slide over internal surfaces of upper and lower cases, recessed portions provided on sides of a front side of the upper surface portion at positions corresponding to outer circumferential edges of the tape reels, and a butt recessed portion formed on a front side of the lower surface portion in such a manner as to correspond to holding ribs provided on a front side of a reel brake sliding area of the lower case along a tape reel receiving area.

In addition, in the present invention, a regulating wall portion for regulating the sliding of the arm of the reel brake member is a guide rib, and the guide rib comprises a linear guide rib oriented toward a back side of the case and a curved guide rib provided on a front side of the case so as to extend outwardly. The linear guide rib and the curved guide rib are provided on internal surfaces of the upper and lower cases in such a manner as to protrude therefrom. In addition, the curved guide rib is provided so as to extend at a height which is taller than the linear guide rib. When the reel brake member is in a brake state, the transverse position of the reel brake member is regulated only on the rear side thereof, and the front side of the reel brake member is allowed to transversely rotate to some extent.

Furthermore, a projection is provided on the arm of the reel brake member in such a manner as to protrude therefrom for abutment with the guide rib, and guide wall portions which the arms of the reel brake member slide along and abut with are provided continuously with outer circumferential ribs provided along the tape reels receiving area. Thus, with the above construction, a regulating mechanism for regulating the movement of the reel brake member in a brake releasing direction functions as the regulating wall portion and prevents the arms of the reel brake member from deflecting inwardly of the brake when the tape cassette is not in use or while the brake releasing operation is being carried out, whereby the brake pawls are constructed not to disengage from the reel areas. Moreover, the reel brake member closes inwardly the arms of the reel brake member in the vicinity of the brake releasing position so that the brake pawls disengage from the reel areas.

In a case, a reel brake member biased by a resilient force so as to engage tape reels is restricted with respect to a movable range thereof by a regulating mechanism for preventing the movement of the reel brake member to such an extent that brake pawls of the reel brake member are released from an engagement with tape reels. In other words, the reel brake member comprises arms provided on both sides of a main body thereof via hinge portions, respectively, the respective arms having the brake pawls at distal ends thereof, a projection provided between the arm and the brake pawl, upper and lower surface portions adapted to slide over internal surfaces of upper and lower cases of the tape cassette, recessed portions formed on the upper surface portion on both sides of the front side at positions corresponding to outer circumferential edges of the tape reels, and a butt recessed portion formed on a front side of the lower surface portion in such a manner as to correspond to holding ribs provided on a front side of a reel brake sliding area of the lower case along a tape reel receiving area. In addition, a regulating wall portion for regulating the sliding of the arm of the reel brake member is a guide rib, and the guide rib comprises a linear guide rib oriented toward a back side of the case and a curved guide rib provided on a front side of the case so as to extend outwardly. Thus, the movable range of the arms of the reel brake member are restricted and regulated, whereby even if an external strong force due to a strong impact such as a drop impact is exerted thereon, the reel brake is prevented from being disengaged. In addition, even if the tape is moved in the tape cassette, since there is no chance for the flange to abut with the reel brake member main body (there is no chance for the brake to be moved by the flange), it is possible to eliminate unnecessary movements of the reel brake member, whereby a secure brake can be provided. In addition, since the reel brake member can transversely rotate (oscillation) at the brake position in conjunction with the respective movements of the respective reels, the reel brake member can follow every movement of the tape, whereby a highly reliable brake condition can be maintained. Moreover, the production of a looseness of the belt is thus prevented from occurring, and there is no risk of problems being generated when the tape cassette is mounted in the recording and reproducing device for use. In addition, the brake release means of the recording and reproducing device abuts with the brake release operating portion of the reel brake member to thereby slidingly move the reel brake member in the sliding operation so that the brake pawls are disengaged from the teeth of the tape reels for safely running of the tape.

DETAILED DESCRIPTION OF THE PREFERRED EMBODIMENTS

First Embodiment

Figure 1:
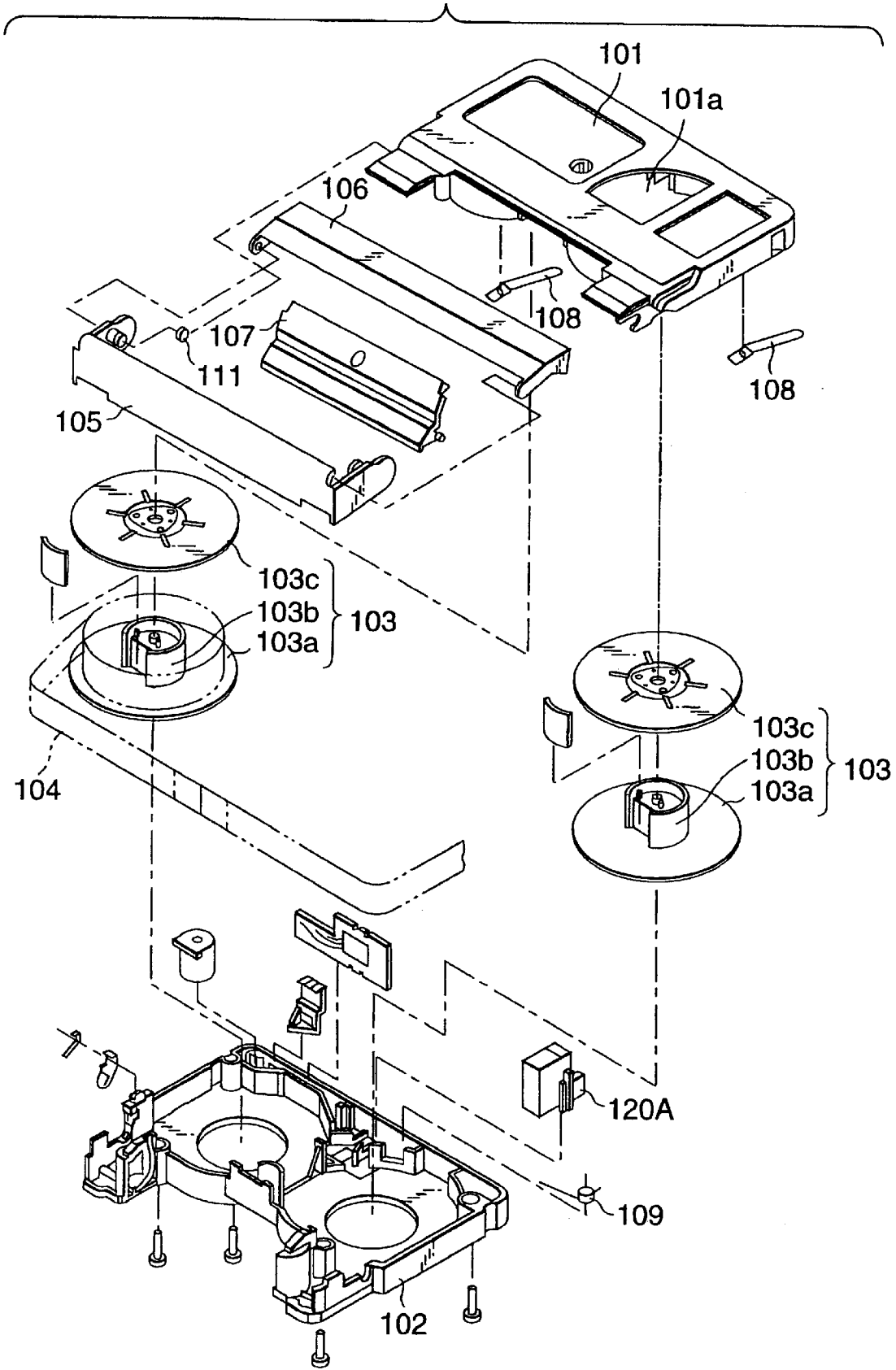
FIG. 1 is an exploded perspective view of a tape cassette of a first embodiment according to the present invention.

Referring to the drawings, a first embodiment of the present invention will be described below. FIG. 1 is an exploded perspective view showing a tape cassette (DVC) to which a first mode of operation of the present invention is to applied. A case main body comprises an upper case 101 and a lower case 102. A pair of tape reels 103 around which a tape-like medium (magnetic tape) 104 for recording information thereon is wound are rotatably received in the case main body.

The tape reel 103 comprises a lower flange 103a formed integrally with a hub portion 103b and a transparent upper flange 103c secured to an upper surface of the hub portion 103b by means of welding or the like. The tape-like medium 104 is disposed such that it comes out of the lower case 102 from an end of a front side thereof, passes through a front portion of the lower case 102 and returns into the case main body from the other end of the front side of the lower case 102.

In addition, a spring 108 is mounted on an internal surface of the upper case 101 for pressing the tape reel downwardly.

Furthermore, mounted on the front side of the case main body are a substantially U-shaped front lid 105 for freely opening and/or closing the front side of the case main body, an upper lid 106 and a rear lid 107. The front lid 105 is rotatably mounted on the upper case 101 and is biased by means of a spring 111 in a closing direction. In addition, the upper lid 106 is mounted on the front lid 105, and the rear lid 107 is mounted on the upper lid 106.

When the tape cassette is not in use, the tape-like medium 104 passing through the front portion of the lower case 102 is protected by means of these front lid 105, upper lid 106 and rear lid 107. On the other hand, when the tape cassette is in use, the front lid 105 is rotated to be moved onto the upper case 101 and in interlock with this movement of the front lid 105, the upper lid 106 and the rear lid 107 retire to predetermined positions and the tape medium 104 situated at the front portion of the lower case 102 is then exposed.

A window portion 101a is formed in the upper case 101 so as to open in a fan-shape, and a flat-plate like window member constituted by a transparent resin is secured to an internal side of an area of the upper case 101 including this window portion 101a. This allows to the tape-like medium 104 to be visualized through the window portion 101a of the tape cartridge and the upper flange 103c of the tape reel for instance with respect to the remaining amount thereof.

Figure 2:
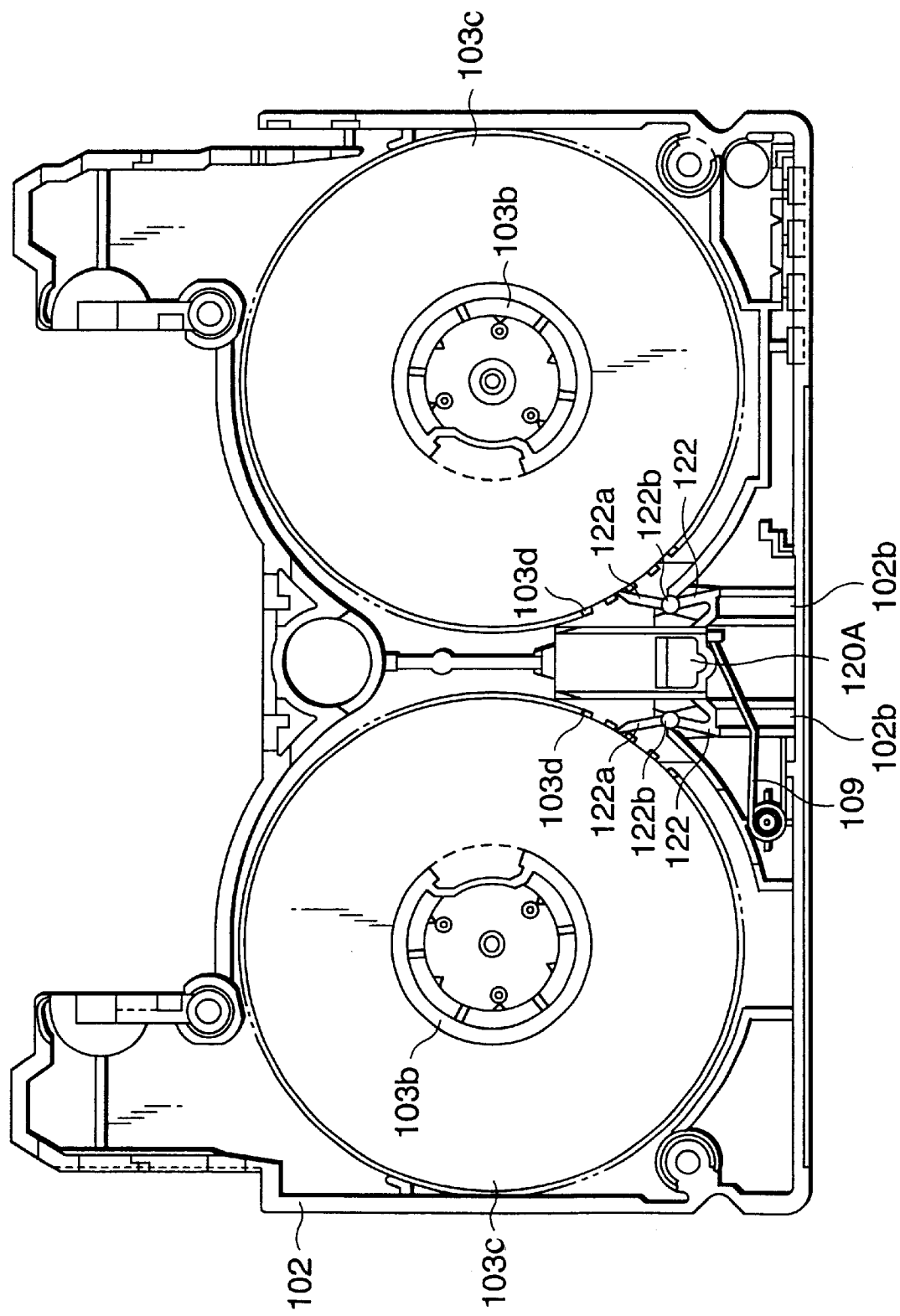
FIG. 2 is a plan view showing the details of a relationship between the reel brake and tape reels.

FIG. 2 is a plan view showing a detailed relationship between a reel brake 120A and the tape reels 103. In FIG. 2, the upper case 101, upper flange 103c of the tape reels 103 and the tape-like medium are removed therefrom.

The reel brake 120A is slidably disposed on the tape reels 103 side in the lower case 102. In other words, guided portions 122b of pawls 122 of the reel brake 120A engage guide grooves 102b on the lower case 102, respectively, and the reel brake 122 slides along the guide grooves 102b. In addition, the reel brake 120A is biased toward the tape reels 103 side by means of a spring 109.

Furthermore, teeth 103d are formed in outer circumferences of the lower flanges 103a of the tape reels 103 and when the tape cassette is not in use, the reel brake is put in a state shown in FIG. 2 in which the distal portions 122a of the pawls 122 of the reel brake 120A enter between the teeth 103d of the lower flanges 103a, respectively, whereby the tape reels 103 are locked, idle rotation of the tape reels 103 being thereby prevented.

On the contrary, when the tape cassette is in use, the reel brake 120A is moved to a rear side of the cassette against a biasing force of the spring 109 to thereby release the engagement between the pawls 122 and the teeth 103d of the lower flanges 103a, the tape reels 103 being thereby put in a rotatable state.

Figure 3A:
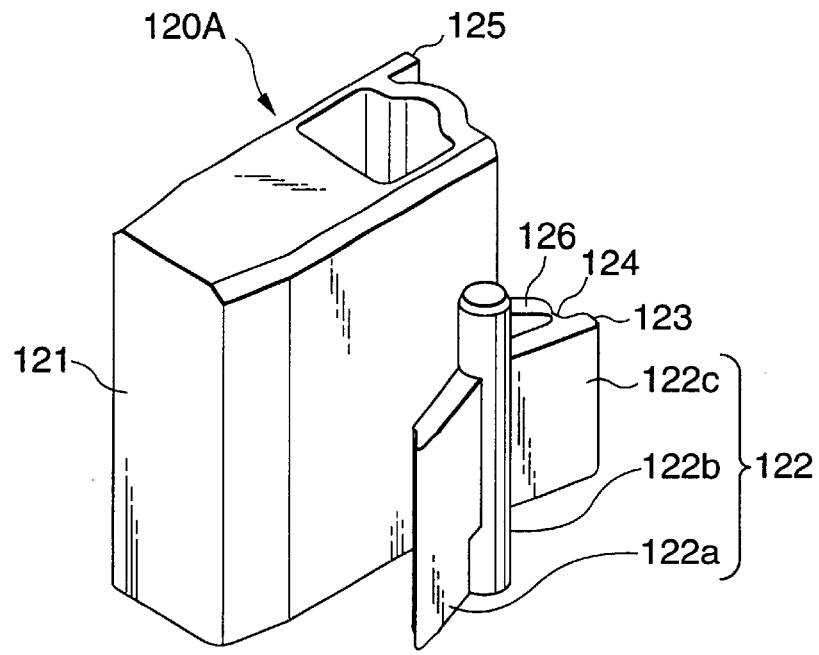
FIG. 3A is a perspective view showing the details of a reel brake as seen from the front.
Figure 3B:
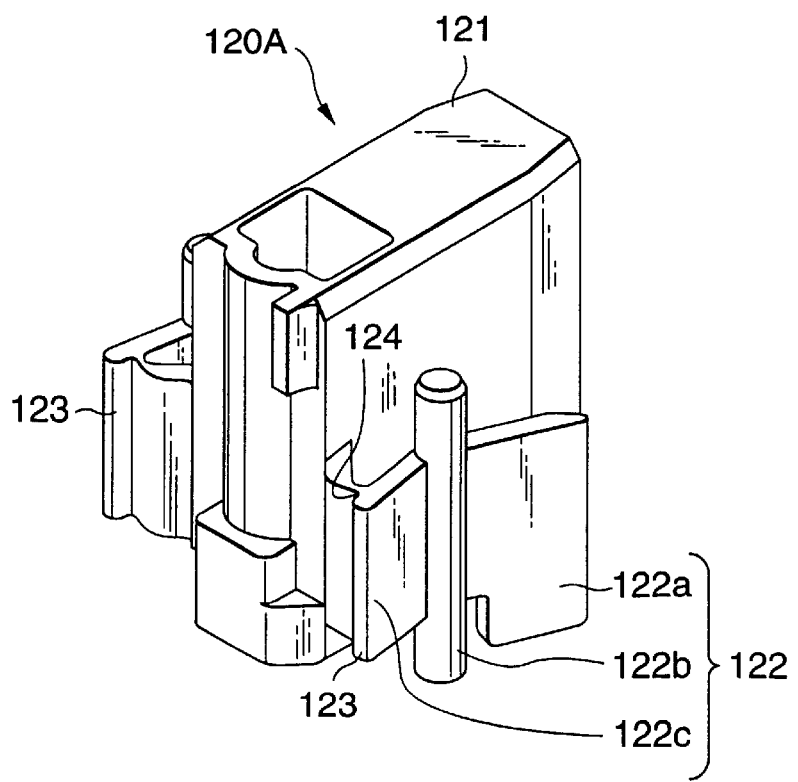
FIG. 3B is a perspective view showing the details of a reel brake as seen from the rear.

FIGS. 3A and 3B are perspective views showing the details of the reel brake 120A, FIG. 3A being a view as seen from the front side, and FIG. 3B being a view as seen from the rear side of the reel brake 120A. The reel brake 120A comprises a main body portion 121, arms 126 provided so as to protrude outwardly from rear portions on left and right sides of the main body portion 121, hinge portions 124 provided at distal ends of the respective arms 126 and pawls 122 connected to the arms 126 via the hinge portions 124, respectively. Moreover, this pawl 122 constituted by a distal end portion 122a adapted to engage the teeth 103d of the tape reel 103, a guided portion 122b adapted engage a guide groove 102b formed in the lower case 102 and a root portion 122c. In this mode of operation of the invention, a regulating rib formed by extending rearward a portion of the root portion 122c which is close to the vicinity of the hinge portion 124 constitutes a regulating portion 123 for regulating the unnecessary rotation (excessive rotation) of the pawl 122.

Figure 4A:
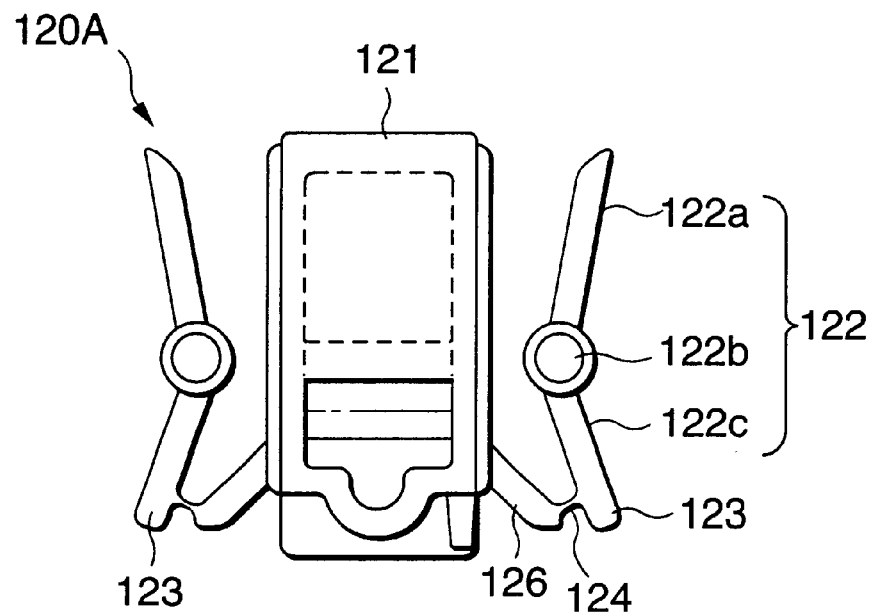
FIG. 4A is a plan view of the reel brake in a state in which the reel brake is in normal use.
Figure 4B:
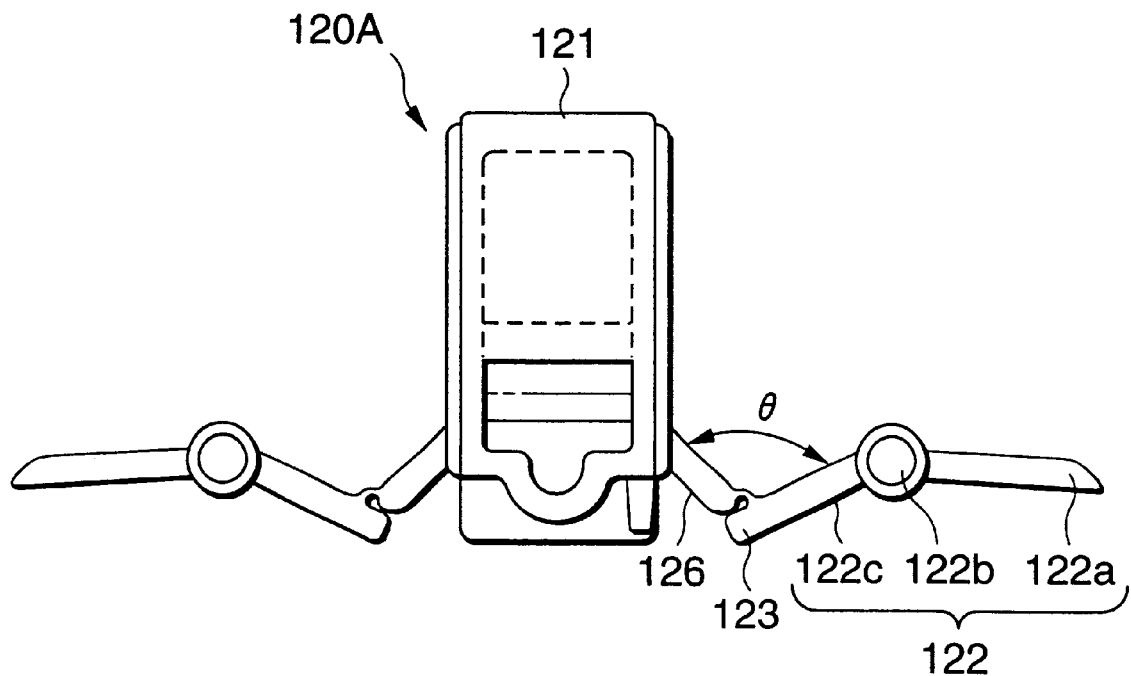
FIG. 4B is is a plan view of the reel brake in a state in which pawls are rotated excessively.

FIGS. 4A and 4B are plan views of the reel brake 120A, FIG. 4A showing a state in which the reel brake 120A is in normal use, and FIG. 4B showing a state in which the pawls 122 are rotated excessively. Then, after they are formed, the reel brakes 120A are received in volume as a part constituting the tape cassette in a box of the like for transportation, and in assembling they are transferred into a part feeder. When this happens, there may be a risk of the pawls 122 being rotated excessively through entanglement of the reel brakes 120A in one another. As shown in FIG. 4B, when the pawls 122 are rotated to a maximum limit in a direction in which the pawls 122 are deployed, the regulating portions 123 situated at the rear end of the root portions 122c of the pawls 122 are brought into abutment with the arms 126, whereby a further rotation of the pawls 122 is prevented.

In addition, the length of the regulating portions 123 needs to be sized such that even when it is received inside the tape cassette, the regulating portion 123 does not interfere with other members. Furthermore, a maximum rotating angle θ of the pawl 122 can easily be set by adjusting the position of the hinge portion 124 for connecting the root portion 122c of the pawl with the distal end of the arm 126.

This construction can prevent the generation of a risk of a cut being generated in the hinge portion 124 or the hinge. portions 124 being cut when an excessive load is exerted on the hinge portions 124. In particular, in this mode of operation, in order to securely prevent the generation of a cut in the hinge portions 124, the maximum rotating angle θ of the pawls 122 may preferably be equal to or less than about 100 degrees.

In addition, when the pawls 122 rotate in a direction opposite to the aforesaid direction, since the pawls 122 abut the main body portion 121, the pawls 122 are not rotated to a position where an excessive load is applied to the hinge portions 124.

Second Embodiment

Figure 5:
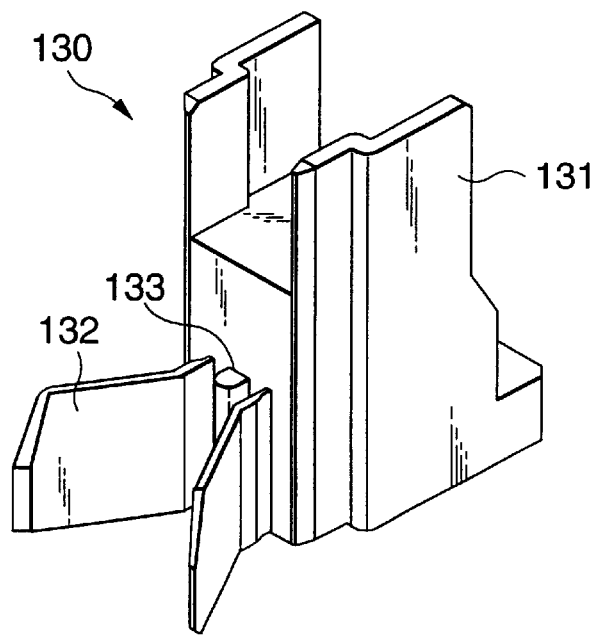
FIG. 5 is a perspective view of a reel brake for a tape cassette according to a second embodiment of the present invention.
Figure 6A:
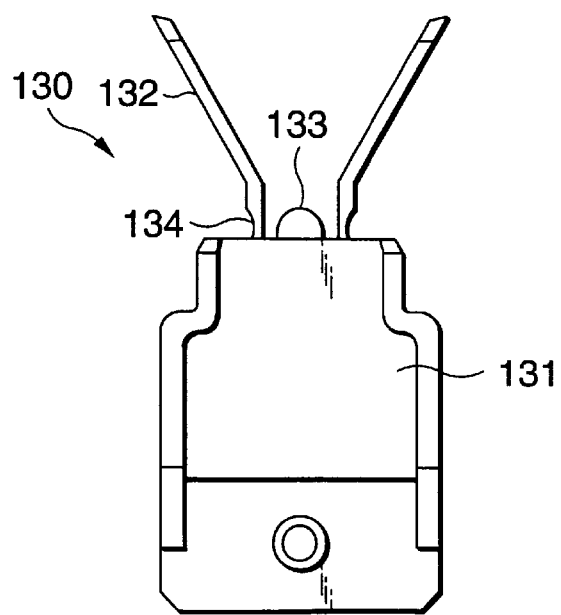
FIG. 6A is a plan view showing the reel brake shown in FIG. 5 in a state the reel brake is in normal use.
Figure 6B:
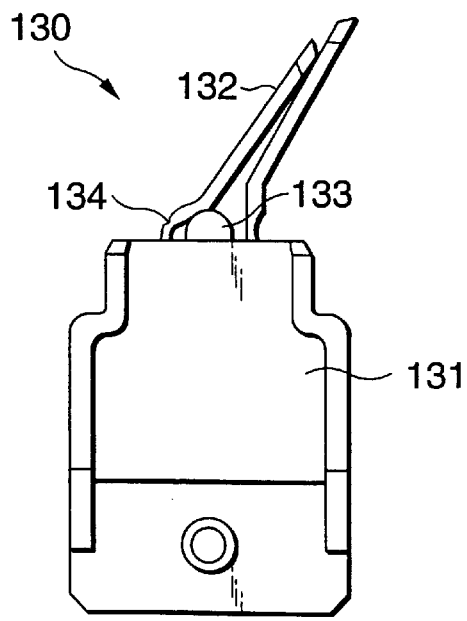
FIG. 6B is a plan view showing the reel brake shown in FIG. 5 in a state a pawl is rotated.

FIG. 5 is a perspective view showing a second embodiment of the present invention. In addition, FIGS. 6A and 6B are plan views of the reel brake 130 shown in FIG. 5, in which FIG. 6A shows a state in which the reel brake 130 is in normal use and FIG. 6B shows a state in which a pawl 132 is rotated. In this reel brake 130, a regulating portion 133 is constituted by a regulating rib provided on the front portion of a main body 131 and having a semi-circular cross-section and is disposed between a pair of hinge portions 134 and a pair of pawls 132. In addition, the pawl 132 is provided via the hinge portion 134 in the vicinity of a position where the regulating portion 133 of the main body 131 is provided.

In FIG. 6A, when the left-hand side pawl 132 is rotated clockwise about the hinge portion 134 as a fulcrum, as shown in FIG. 6B, the pawl 132 is brought into abutment with the regulating portion 133 and a further rotation of the pawl 132 is prevented. Thus, even with the second mode of operation of the present invention, it is possible to prevent the generation of a cut in the hinge portion 134 due to an excessive load exerted on the hinge portion 134 when the pawl 132 is rotated excessively. Furthermore, with this second mode of operation, it is possible to prevent the excessive rotation of the pawl 132 only with one regulating portion 133.

As mentioned above, according to the first aspect of the present invention, even if the pawls are rotated excessively when the reel brakes are transported or transferred into an automatic assembling machine, since a rotation exceeding a certain angle is prevented by the regulating portions, it is possible to prevent the breakage of the hinge portion or loss of a lock function that would be caused when the hinge portion is cut broken while a tape cassette is in use which has mistakenly incorporated therein a reel brake which happens to have a hinge portion having caused therein a cut.

Third Embodiment

Figure 7:
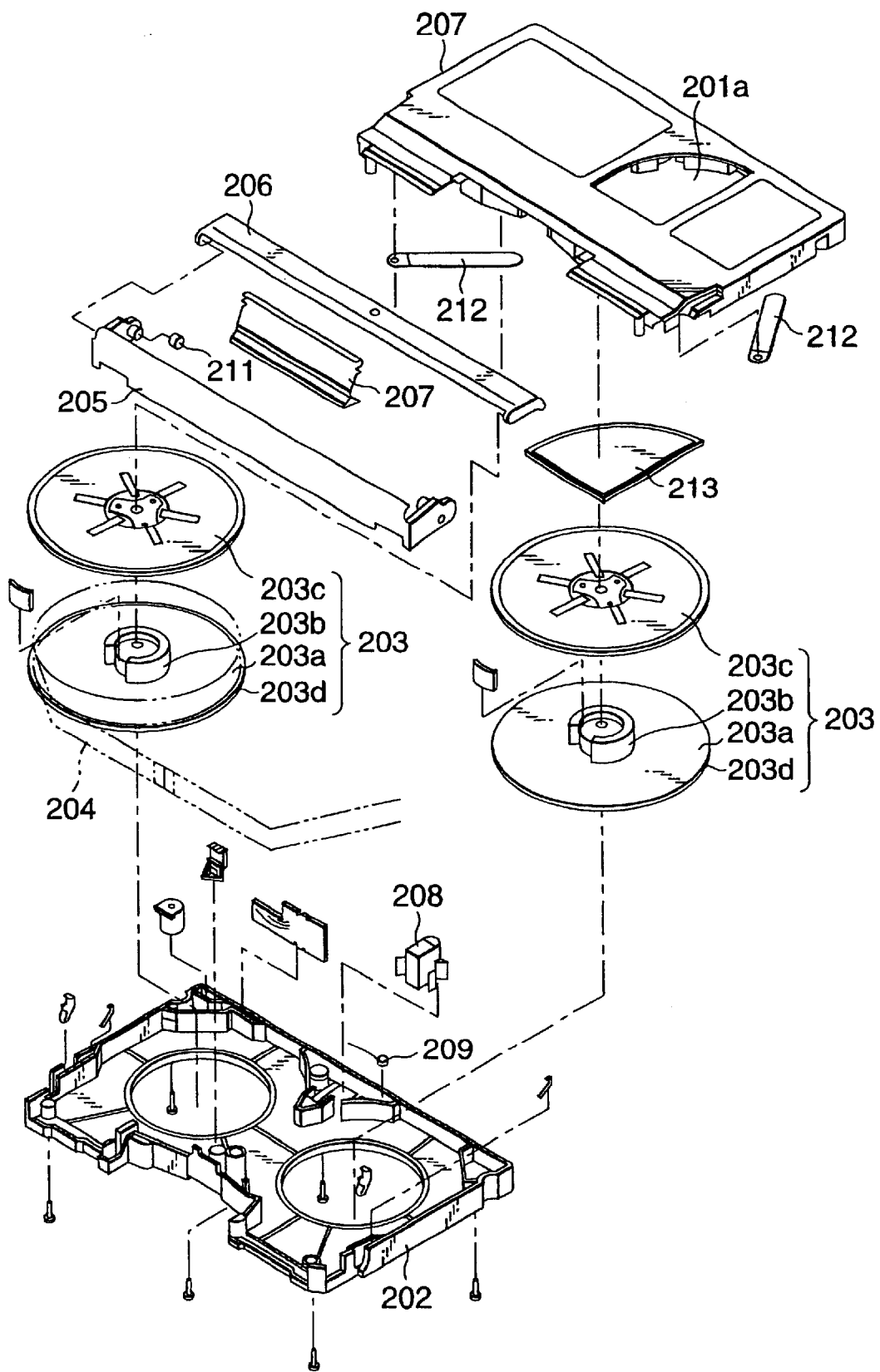
FIG. 7 is an exploded perspective view showing a tape cassette according to a third embodiment of the present invention.

Referring to the drawings, a third embodiment of the present invention will be described below. FIG. 7 is an exploded perspective view showing a tape cassette (DVC) according to the mode of operation of the present invention. A case main body comprises an upper case 201 and a lower case 202. A pair of tape reels 203 around which a tape-like medium (magnetic tape) 204 for recording information is wound are rotatably received in the case main body. A spring 212 is attached to an internal surface of the upper case 201 for pressing the tape reels 203 downwardly.

The tape reel 203 comprises a lower flange 203a formed integrally with a hub portion 203b and a transparent upper flange 203c secured to an upper surface of the hub portion 203b by means of welding or the like. The tape-like medium 204 is disposed such that it comes out of an end of a front side of the lower case 202, passes through a front portion of the lower case 202 and returns into the case main body from the other end of the front side of the lower case 202.

Attached to the front side of the upper case 201 are a substantially U-shaped front lid 205 adapted to freely open and/or close the front side of the case main body, an upper lid and a rear lid 207. The front lid 205 is rotatably attached to the upper case 201 and is biased in a closing direction by means of a spring 211. In addition, the front lid 205 is attached to the upper lid 206, and the upper lid 206 is then attached to the rear lid 207.

When the tape cassette is not in use, the tape-like medium 204 passing thorough the front portion of the lower case 202 is covered with these front lid 205, upper lid 206 and rear lid 207 for protection. On the contrary, when the tape cassette is in use, the front lid 205 is rotated so as to be moved onto the upper lid 206, and in interlock with this movement of the front lid 205, the upper lid 206 and the rear lid 207 retire to predetermined positions, whereby the tape-like medium 204 situated at the front portion of the lower case 202 is then exposed.

A fan-shaped opening 201a is formed in the upper case 201, and a flat-plate like window member 213 formed of a transparent resin is secured to an internal side of an area of the upper case 201 including this opening 201a. The tape-like medium 204 can be visualized by this window member 213 through the transparent upper flange 203c with respect, for instance, to the remaining amount thereof.

Figure 8A:
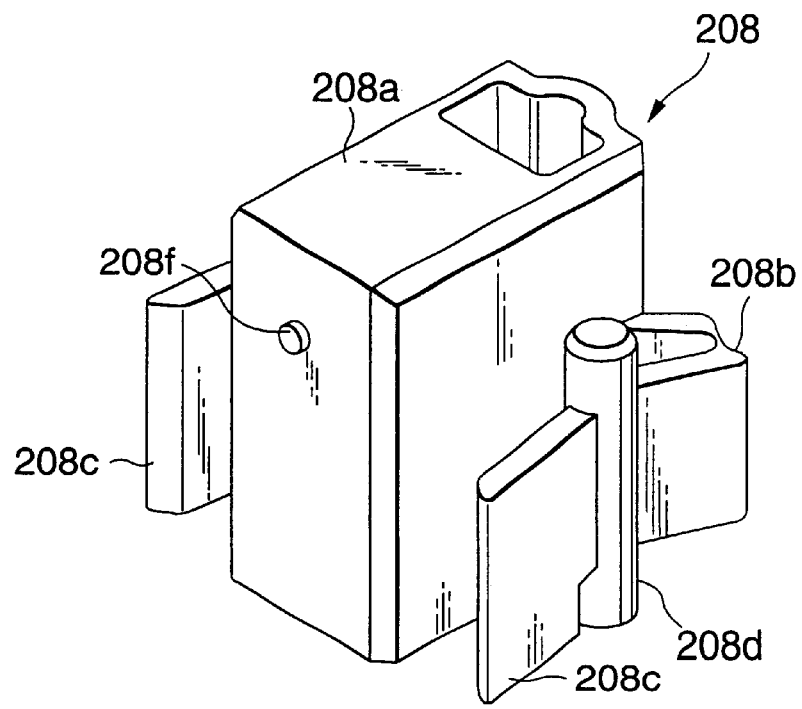
FIG. 8A is a perspective views showing in detail the reel brake shown in FIG. 7 seen from the front of the reel brake.
Figure 8B:
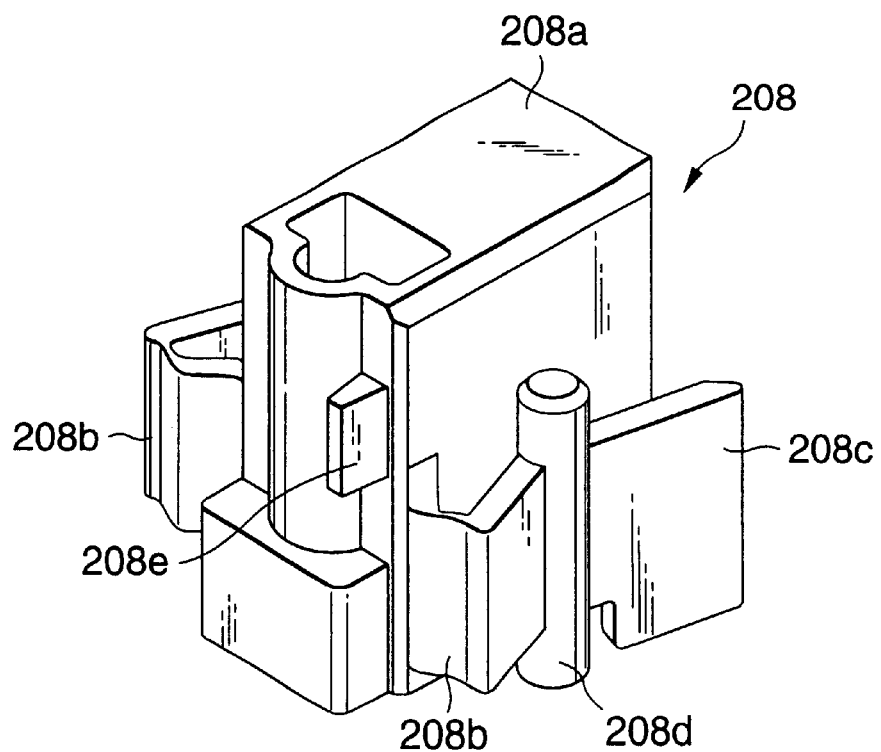
FIG. 8B is a perspective views showing in detail the reel brake shown in FIG. 7 seen from the rear sides of the reel brake.

FIGS. 8A and 8B are perspective views showing the details of a reel brake 208, respectively, seen from the front side and rear side of the reel brake. Pawls 208c for engaging teeth 203d formed in the tape reels 203 are provided on left and right sides of a main body 208a of the reel brake 208. This pawl 208c is connected to the main body 208a via a thinned hinge portion 208b and can freely rotate via this hinge portion 208b. In addition, a guide shaft 208d is provided on the pawl 208c for engagement with the lower case 202 side.

In addition, a projecting convex portion 208e is provided on a back of the main body 208a at an upper end corner thereof. This convex portion 208e is intended to prevent the disengagement of the main body 208a from a spring 209. Furthermore, a gate portion 208f is provided on a front of the main body 208a at a centrally upper portion thereof. Thus, the provision of the gate portion 208f at the central position on the front of the main body 208a provides a good balance in resin flow at the time of molding to thereby improve the moldability of the thinned hinge portions 208b.

Figure 9:
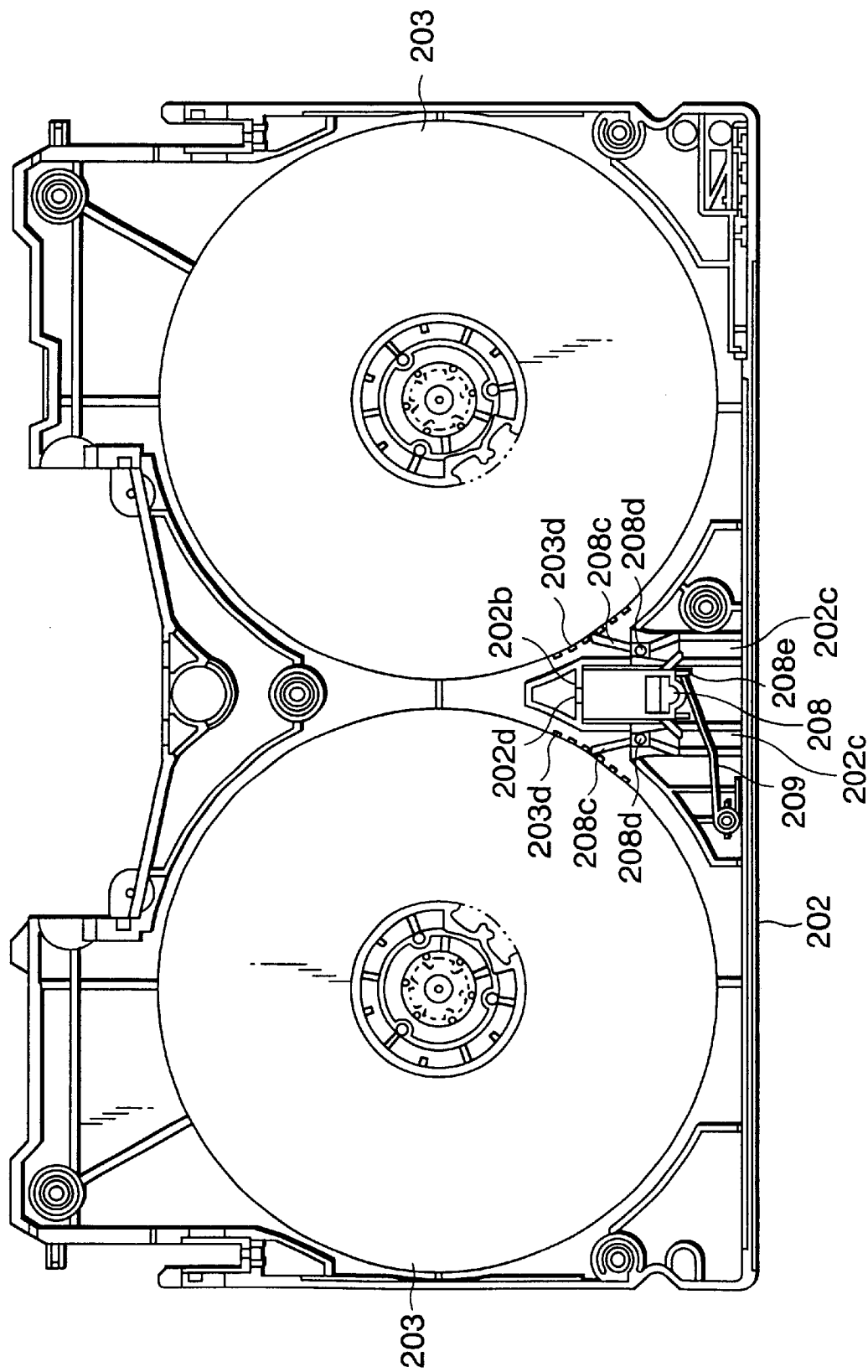
FIG. 9 is a plan view showing in detail a state in which the reel brake, a spring and tape reels are mounted on an internal surface side of a lower case.

FIG. 9 is a plan view showing in detail a state in which the reel brake 208, the spring 209 and the tape reels 203 are mounted on an internal surface side of the lower case 202. The reel brake 208 is disposed centrally rearward inside the lower case 202 and is biased by the spring 209 toward a tape reels 203 side. The spring 209 presses against the back of the main body 208a of the reel brake 208 and the convex portion 208e provided on this back prevents the disengagement of the spring 209 from the main body 208a.

In addition, guide grooves 202c are formed on the lower case 202, and the guide shafts 208d of the reel brake 208 engage these guide grooves 202c of the lower case 202, whereby the reel brake 208 slides along the guide grooves 202c toward/away from the tape reels 203.

Furthermore, when the reel brake 208 slides, upper and lower surfaces of the main body 208a of the reel brake 208 slide along the upper case 201 and the lower case 202, respectively, but since there is provided no gate portion 208f on these surfaces, such sliding of the reel brake 208 is affected by nothing.

Figure 10A:
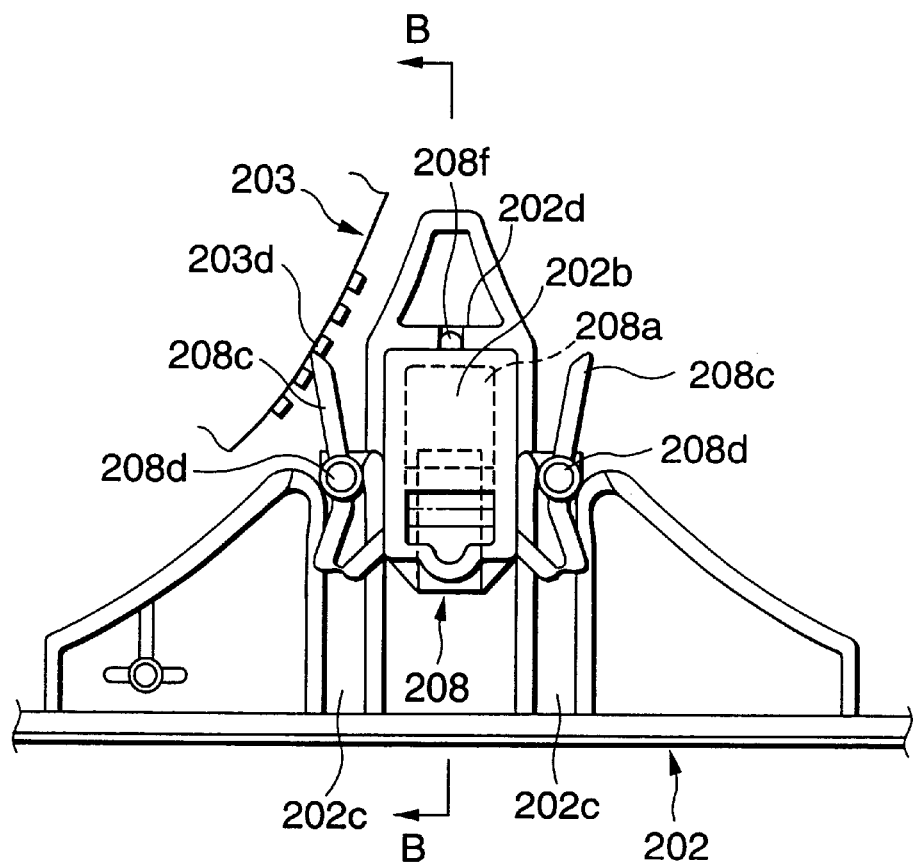
FIGS. 10A and 10B are a plan view and a sectional view showing a relationship between the reel brake and a position regulating wall of the lower case.
Figure 10B:
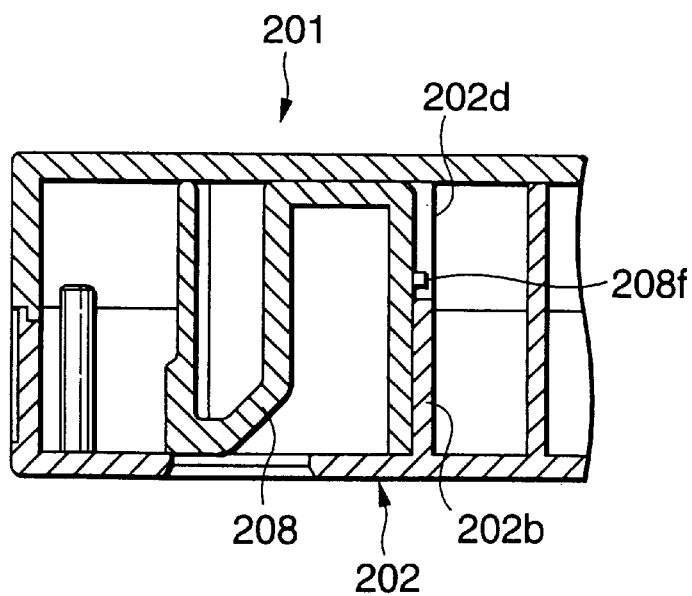
Figure 11A:
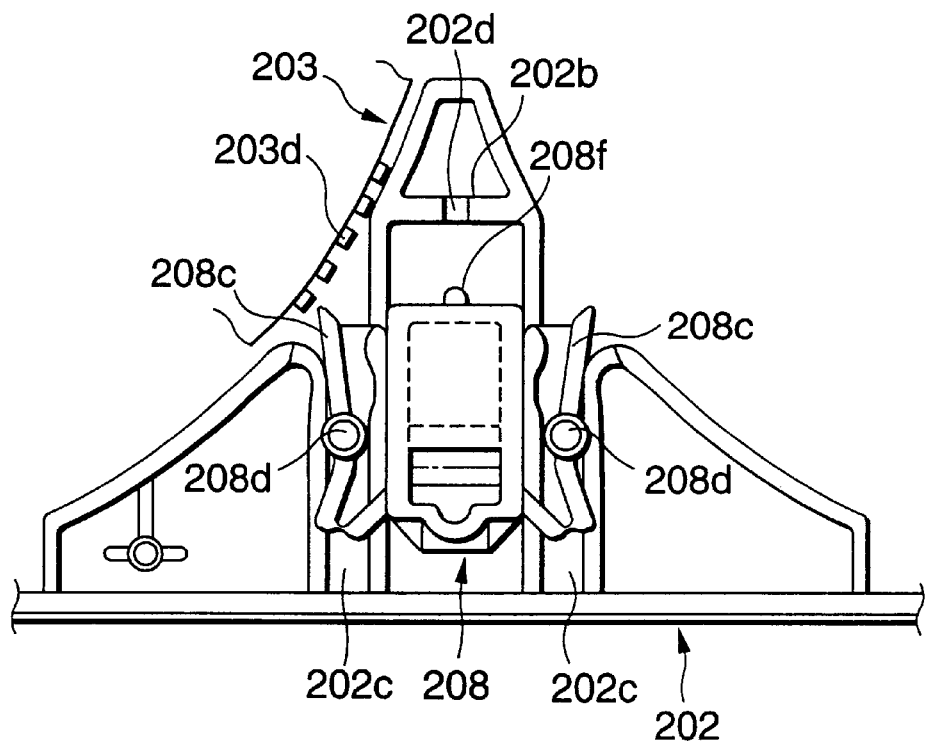
FIGS. 11A and 11B are views showing a state in which the engagement between the reel brake and the tape reels is released from the state shown in FIGS. 10A and 10B.
Figure 11B:
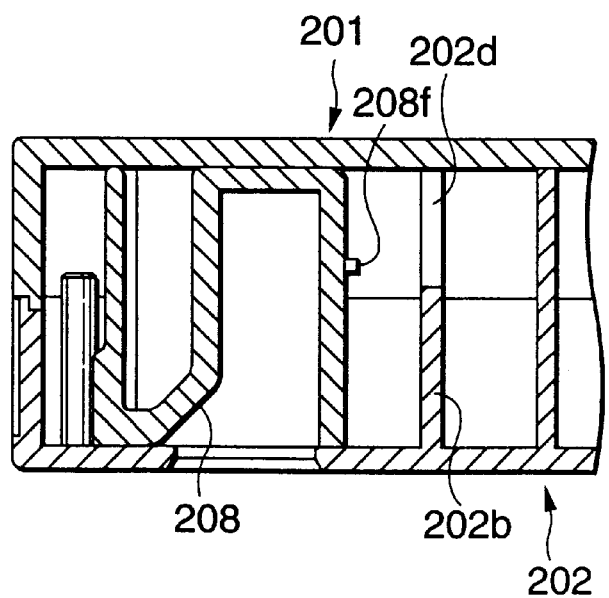

FIGS. 10A and 10B show a relationship between the reel brake 208 and a position regulating wall 202b of the lower case 202, in which FIG. 10A is a plan view and FIG. 10B is a section corresponding to a section taken along a plane B—B of FIG. 10A and the section includes the upper case 201. In addition, FIG. 11A and 11B shows a state in which the engagement between the reel brake 208 and the tape reels 203 are released from the state shown in FIGS. 10A and 10B.

The position regulating wall 202b is provided on the lower case 202 in such a manner as to confront the front of the main body 208a of the reel brake 208. When the reel brake 208 slides to the tape reels 203 side, the front of the main body 208a of the reel brake 208 is brought into abutment with the position regulating wall 202b. Here, a run off or notched portion 202d shaped as a groove notched in a substantially U-shape from above is formed in a central portion of the position regulating wall 202b.

The gate portion 208f of the reel brake 208 is disposed such that it fits in the notched portion 202d in the position regulating wall 202b when the reel brake 208 is brought into abutment with the position regulating wall 202b. Therefore, since the gate portion 208f of the reel brake 208 does not directly abut with the position regulating wall 202b, even if a projection (the remains of the gate) remains on the gate portion 208f, there is no chance of the sliding of the reel brake 208 being checked before the front of the main body 208a of the reel brake 208 is brought into close contact with the position regulating wall 202b. This allows the reel brake 208 to securely slide to a position where it engages with the tape reels 203 even when the gate portion 208f is provided on the front of the main body 208a of the reel brake 208 in order to improve the moldability of thereof, thereby making it possible for the pawls 208c of the reel brake 208 to securely engage with 25 the teeth 203d of the tape reels 203.

In the above mode of operation of the invention, the position regulating wall 202b is constituted by a rib-like member provided on the lower case 202, but the configuration thereof is not limited to a wall-like configuration but any configuration may be used provided that it allows the front of the main body 208a of the reel brake 208 to abut therewith.

Fourth Embodiment

Figure 12A:
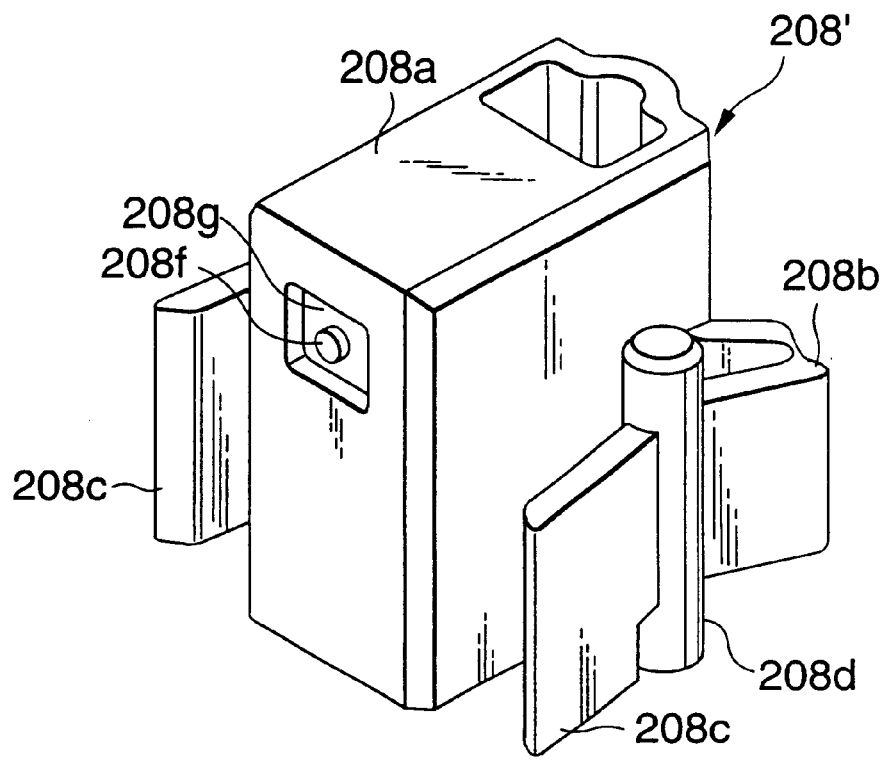
FIGS. 12A and 12B are views showing a reel brake for a tape cassette according to a fourth embodiment of the present invention.
Figure 12B:
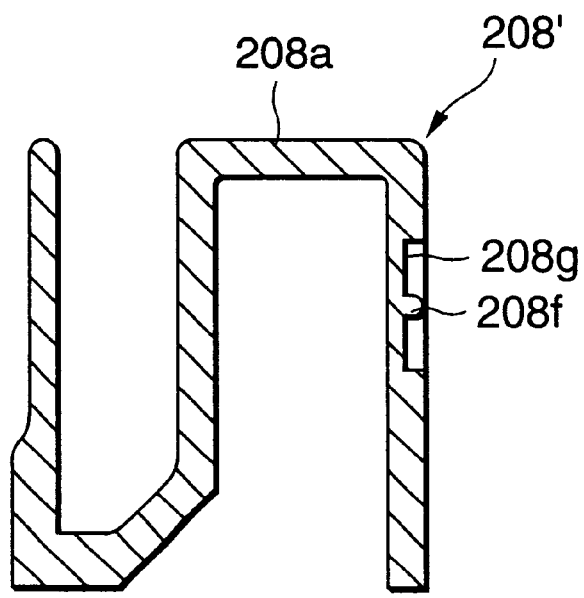
Figure 13:
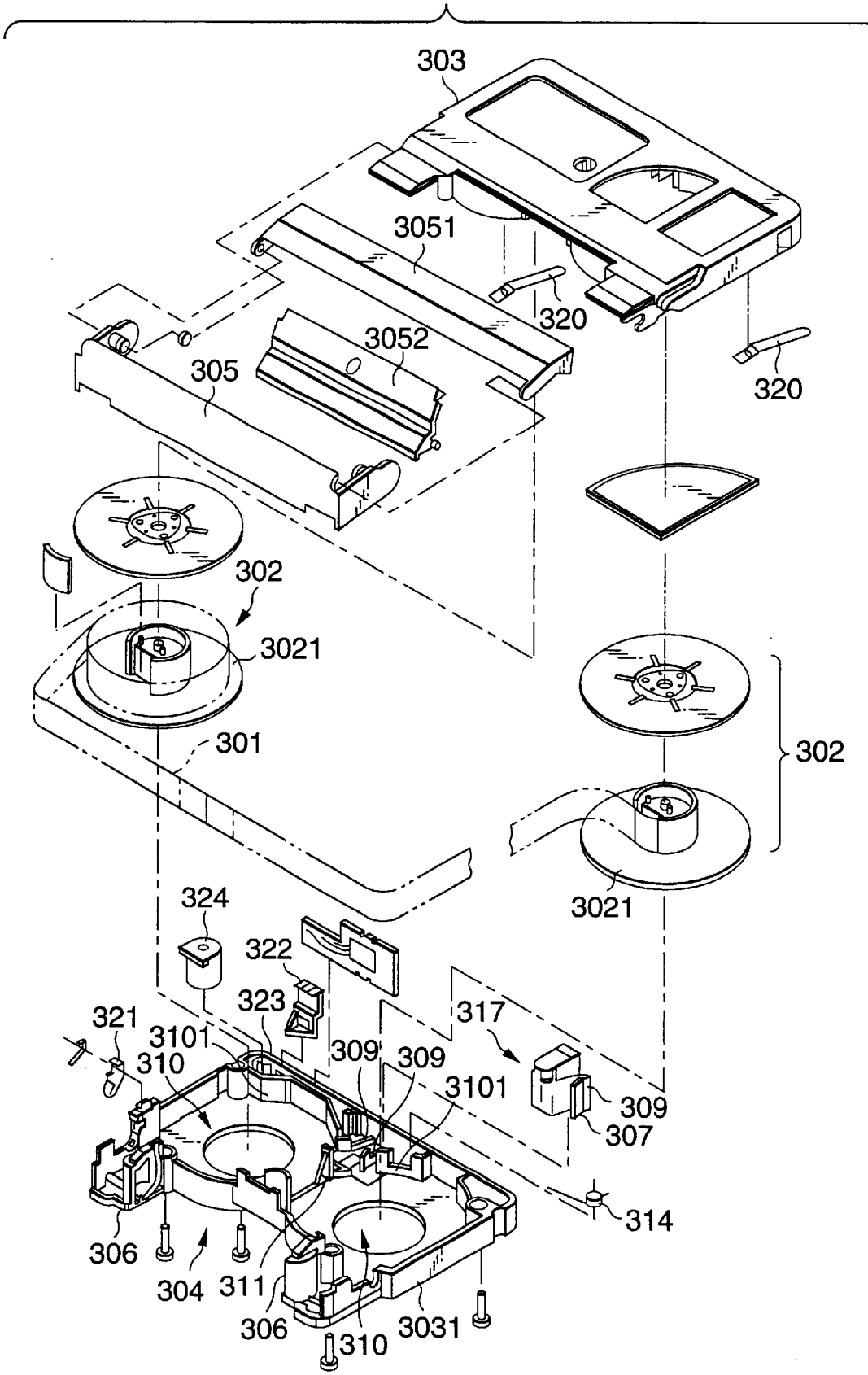
FIG. 13 is an exploded perspective view showing a fifth embodiment of the present invention.
Figure 14A:
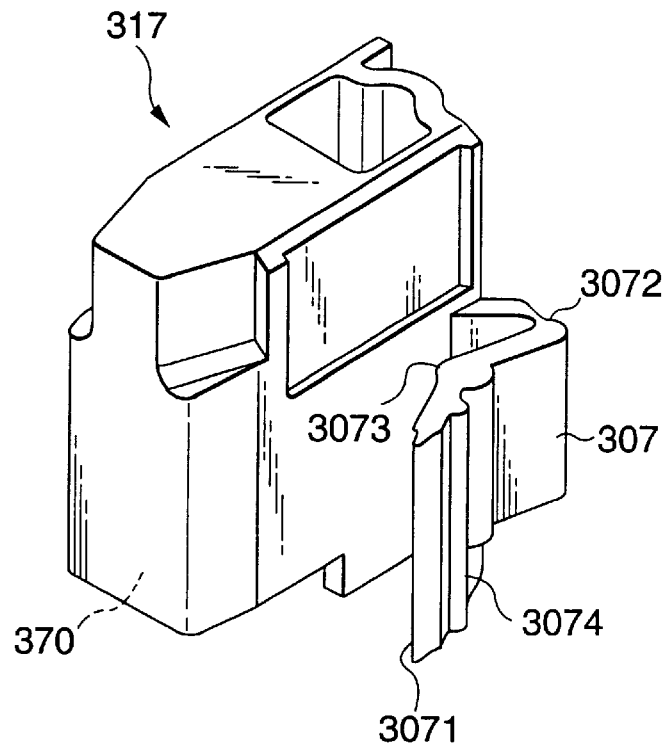
FIGS. 14A and 14B are enlarged perspective views of the reel brake member according to the embodiment shown in FIG. 13.
Figure 14B:
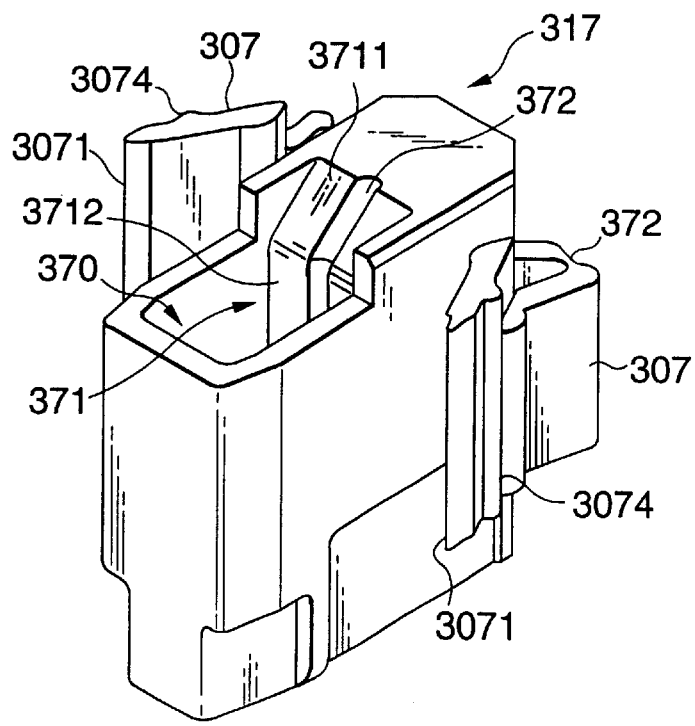
Figure 15A:
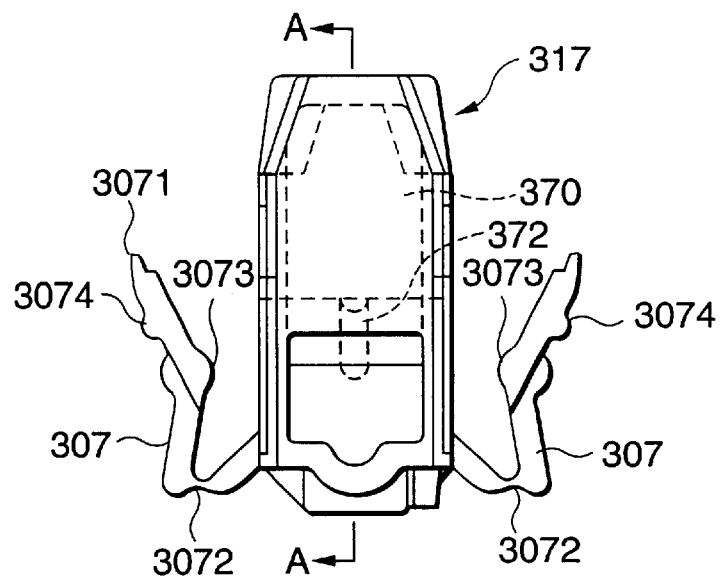
FIGS. 15A to 15C are enlarged views of the reel brake member shown in FIG. 13.
Figure 15B:
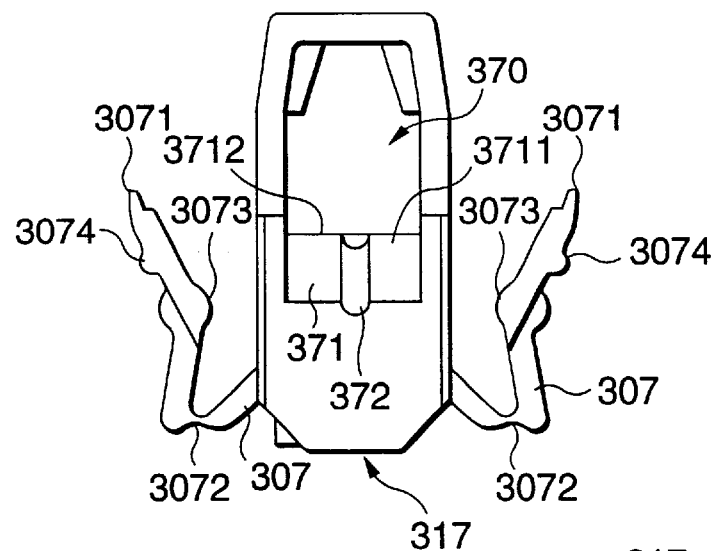
Figure 15C:
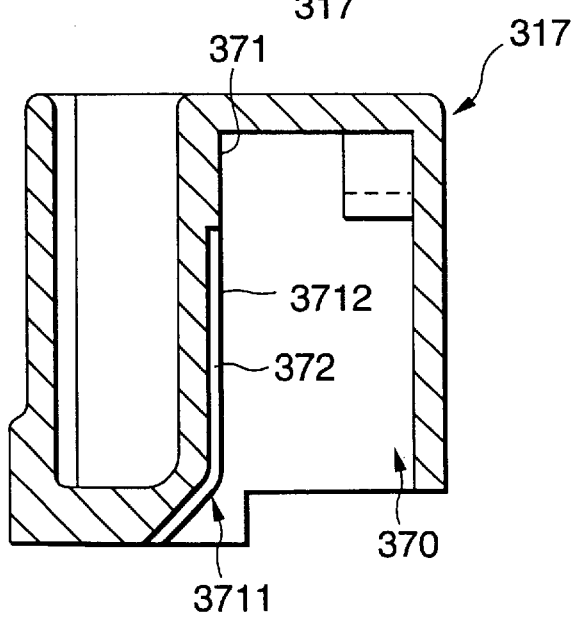
Figure 16:
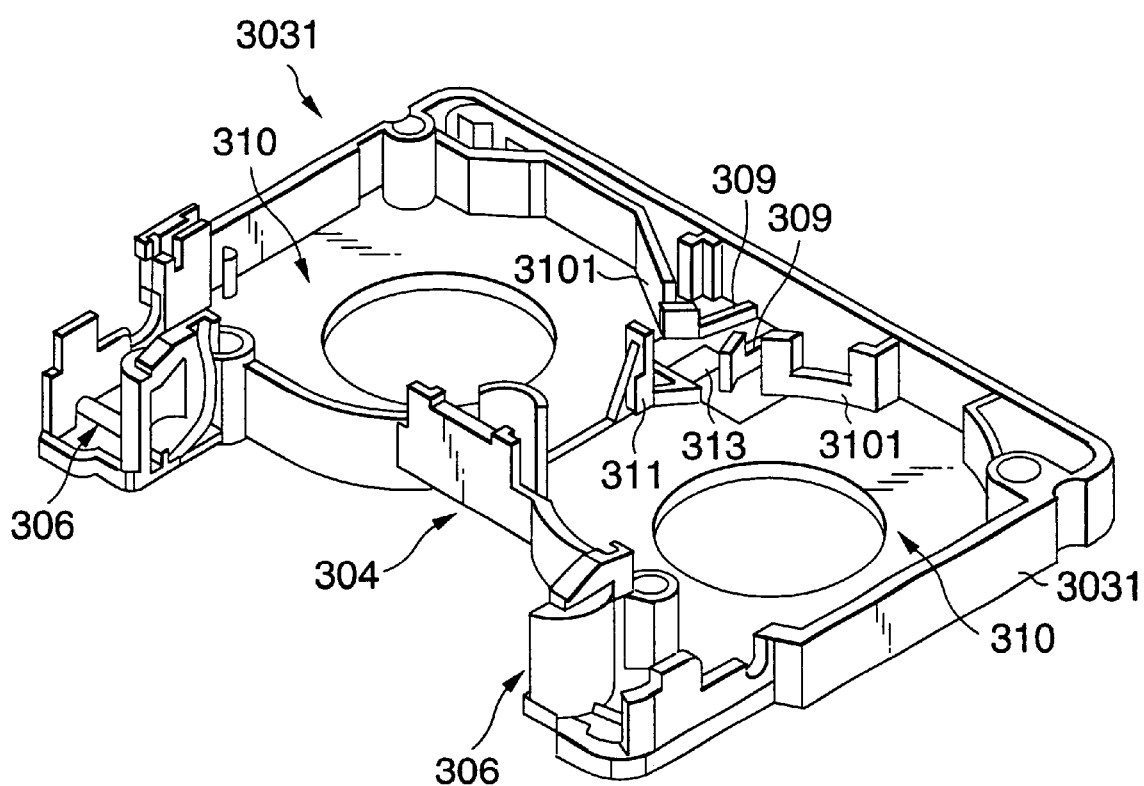
FIG. 16 is a perspective view showing the enlarged case shown in FIG. 13.

FIGS. 12A and 12B show a reel brake for a tape cassette according to a fourth embodiment of the present invention. FIG. 12A is a perspective view as seen from a front side of the reel brake 208, and FIG. 12B is a sectional view taken along a vertical line at a central portion of the reel brake 208. In this reel brake 208, although the gate portion 208f is provided at the same position as that provided in the aforesaid third embodiment, the second embodiment is different from the third embodiment in that a recessed portion 208g is formed by lowering a peripheral portion of the gate portion 208f in a step-like fashion. The depth of this recessed portion 2088 needs to be deeper than a height of a projecting resin that remains at the gate portion 208f. With this construction, there is no need to form the notched portion 202d in the position regulating wall 202b of the lower case 202.

However, in this case, since the thickness of the recessed portion 208g in the front of the main body 208a of the reel brake 208 has to be thin, the third embodiment is preferable to the fourth embodiment from the viewpoint of uniformity of thickness.

According to the second aspect of the invention, since the interference between the gate portion of the reel brake and the position regulating portion of the case main body can be prevented while the moldability of the reel brake is maintained, a secure engagement between the reel brake and the tape reels can be effected when the tape cassette is not in use.

In addition, the thickness of the reel brake can be uniformed and the interference between the gate portion of the reel brake and the position regulating portion of the case main body can be prevented.

Fifth Embodiment

Referring to FIGS. 13 to 18, an embodiment of the present invention will be described. A tape cassette according to the fifth embodiment comprises a pair of tape reels 302 around which a tape 301 is wound rotatably received in a case comprising upper and lower cases 303, 3031, the tape 301 being constructed to extend from one of the tape reels 302, pass through a front of the case and be wound up around the other tape reel 302, an opening portion 304 formed for allowing the tape 301 extending along the front of the case to be exposed therefrom, a lid member comprising a front lid 305 for covering a front of the tape 301 situated inside the opening 304, an upper lid 3051 for covering an upper surface of the tape 301 and a rear lid 3052 for covering a back of the tape 301 and adapted to be freely opened and/or closed by means of a lid opening and/or closing mechanism, tape exit and entrance 306 provided for pulling out the tape 301 and a reel brake member 317 comprising a pair of arms 307 each having a brake pawl 3071 for suppressing the rotation of the tape reels 302 and adapted to freely be slid in back and forth directions for engagement with and/or disengagement from teeth 3021 on outer circumferences of lower flanges of the tape reels 302 to thereby perform braking and brake releasing operations, and the reel brake member 317 is biased by means of a spring 314 to a tape reels side.

As shown in FIGS. 14A, 14B, 15A, 15B and 15C, the reel brake member 317 has the arms 307 disposed so as to be connected to sides of a main body thereof at hinge portions 3072, which arms 307 each have the brake pawl 3071 at a distal end thereof. Pin-like projections 3073, 3074 are provided at substantially intermediate positions between the brake pawl 3071 of the arm 307 and the hinge portion 3072, and the arms 307 are pushed forward (to the tape reels 302a side) by means of springs 314 thereat at all times so that the brake pawls 3071 are constructed so as to engage the teeth 3021 of the tape reels 302, whereby the tape reels 302 are prevented from rotating. In addition, the reel brake member 317 has an opening hole portion 370 for insertion of the brake release member P on a device side, and a guide recessed portion 372 for guiding the brake release member P is formed in a central portion of an abutment side wall portion 371 of the brake release member P in the opening hole portion 370.

This guide recessed portion 372 is formed in a vertical direction in the abutment side wall portion 371 of the brake release member P in the center of the opening hole portion 370, and an internal surface of the guide recessed portion 371 is formed into a U-shaped groove having a curved surface (FIGS. 14A, 14B, 15A, 15B and 15C). However, a V-shaped groove having a relatively large included angle may be used instead.

In addition, an inclined surface 3711 is formed on a lower side of the abutment side wall portion 371 of the brake release member P and formed on an upper side thereof is a vertical surface 3712. Moreover, both sides of the guide recessed portion 372 through which the brake release member P is fittingly inserted are formed into flat surface portions. The guide recessed portion 372 formed in this vertical surface 3712 is formed so as to extend to a position into which the brake release member P is caused to penetrate. Then, the brake release member P on a device side is inserted from the brake releasing opening portion 313 formed in the lower case 3031, whereby the reel brake member 317 having the opening hole portion 370 facing the brake releasing opening portion 313 is moved rearward against the spring force of the spring 314, whereby the brake is released.

Figure 17A:
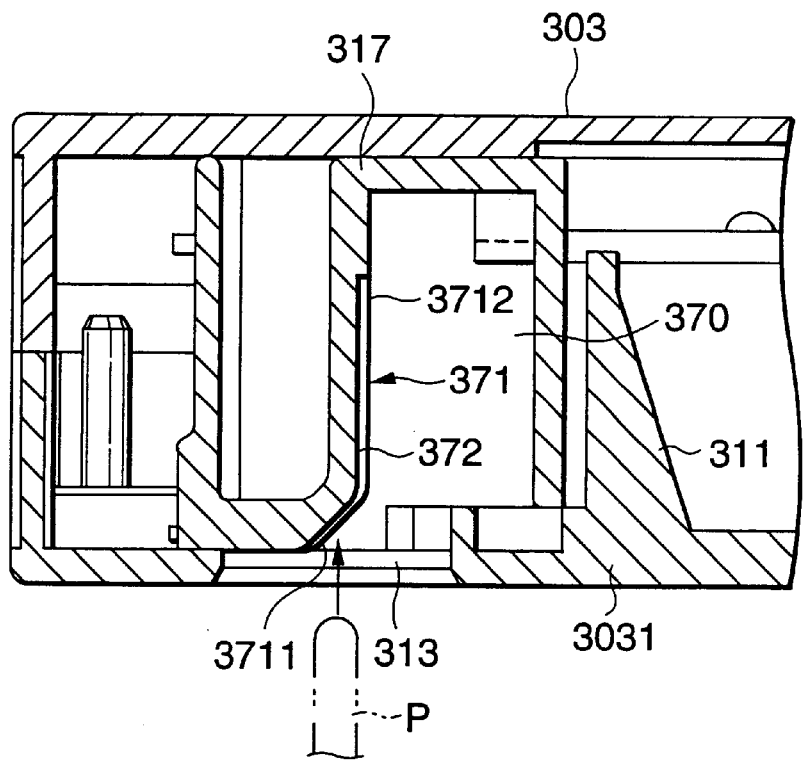
FIGS. 17A and 17B are operation views in which a reel brake member is mounted on the case shown in FIG. 13.
Figure 17B:
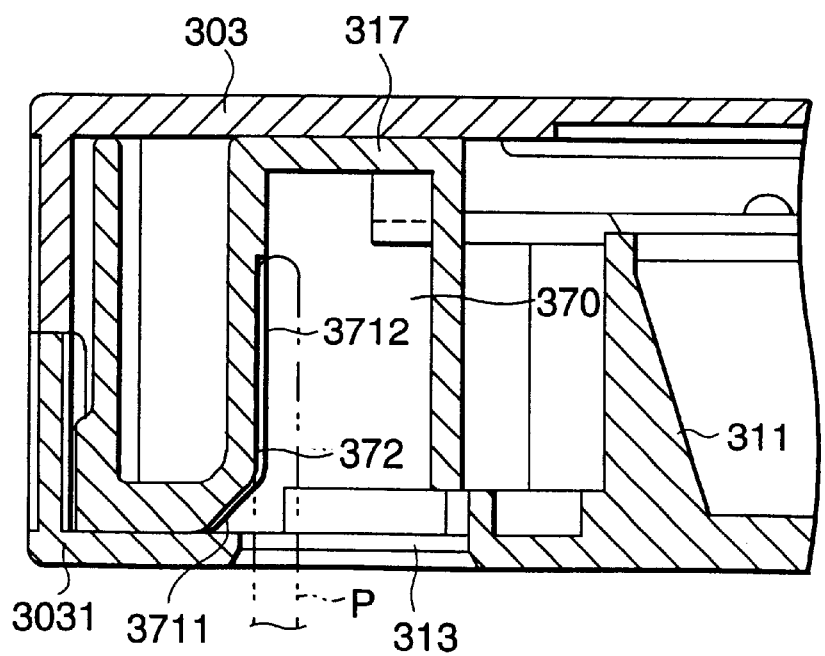
Figure 18A:
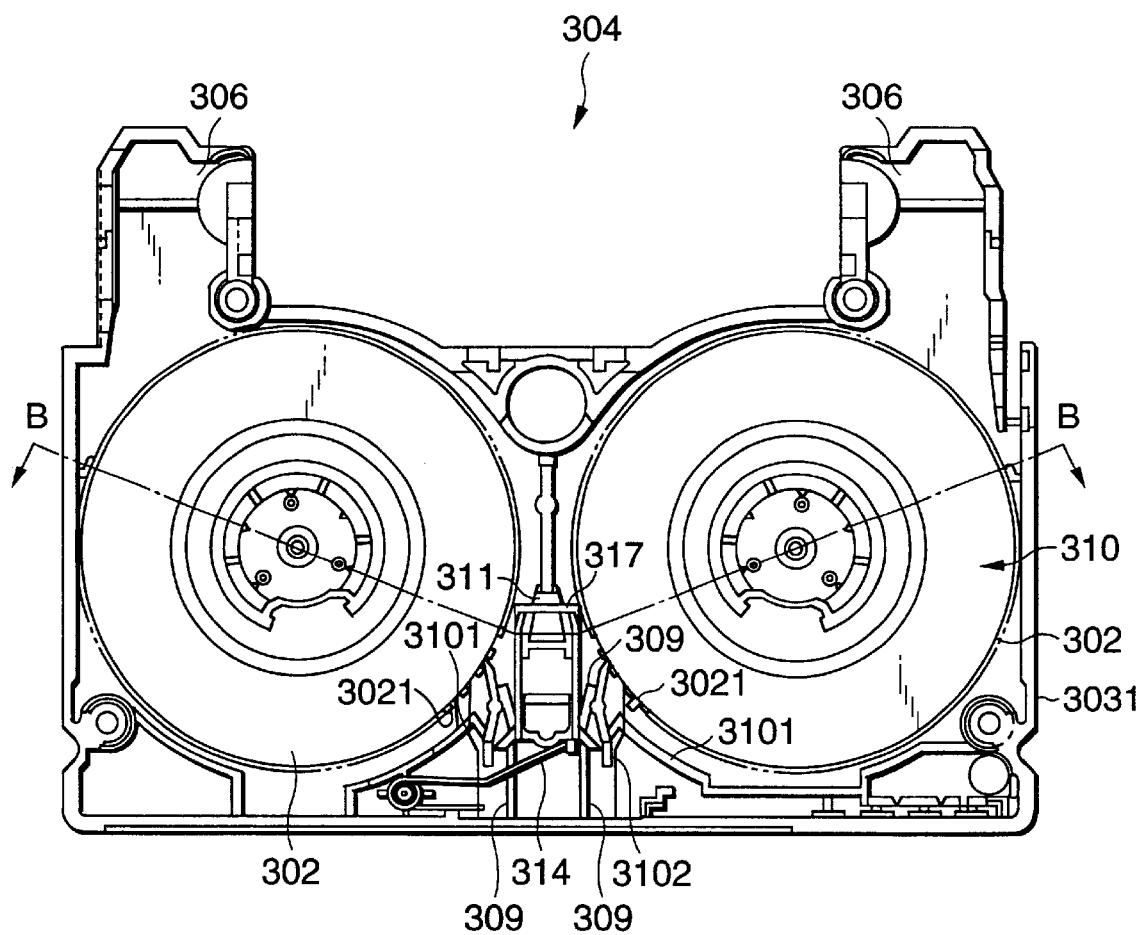
FIGS. 18A and 18B are operational views in which the reel brake member as shown FIGS. 17A and 17B.
Figure 18B:
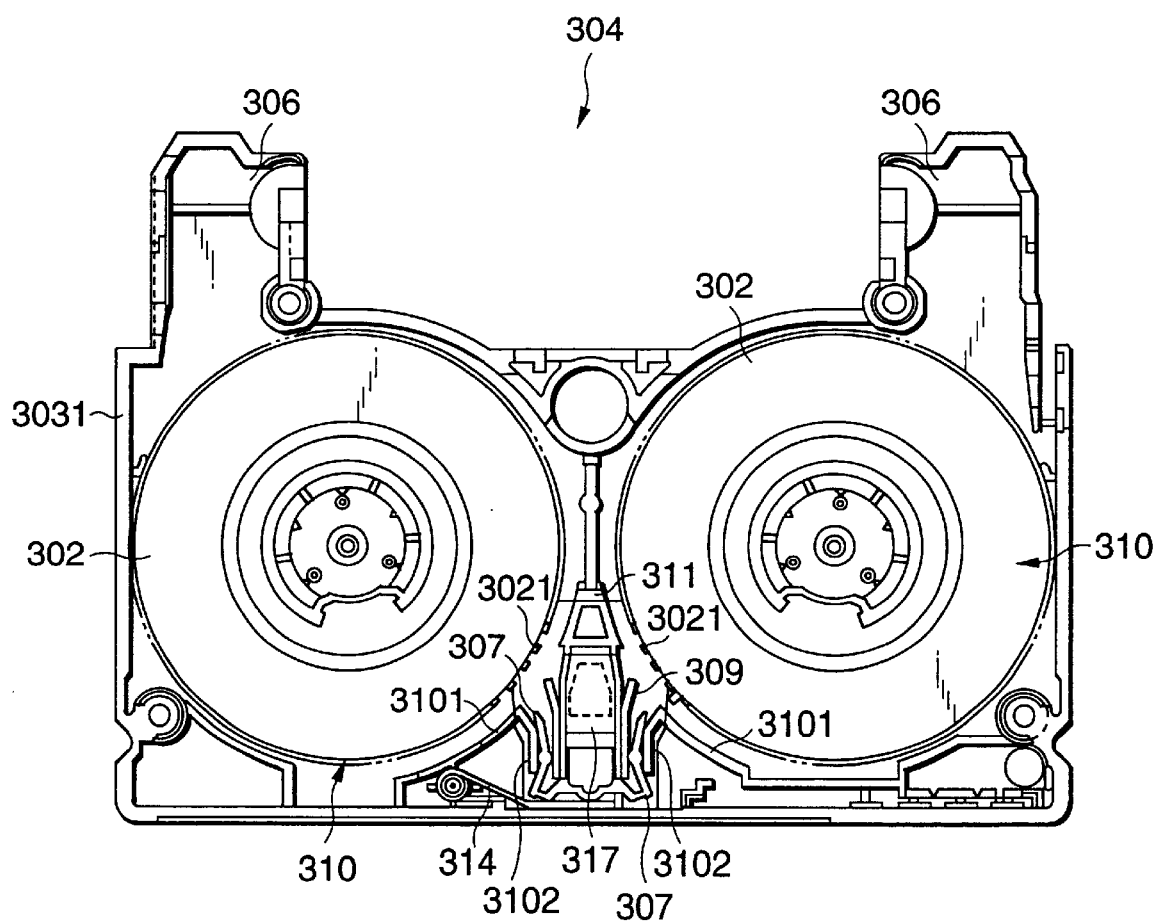
Figure 19:
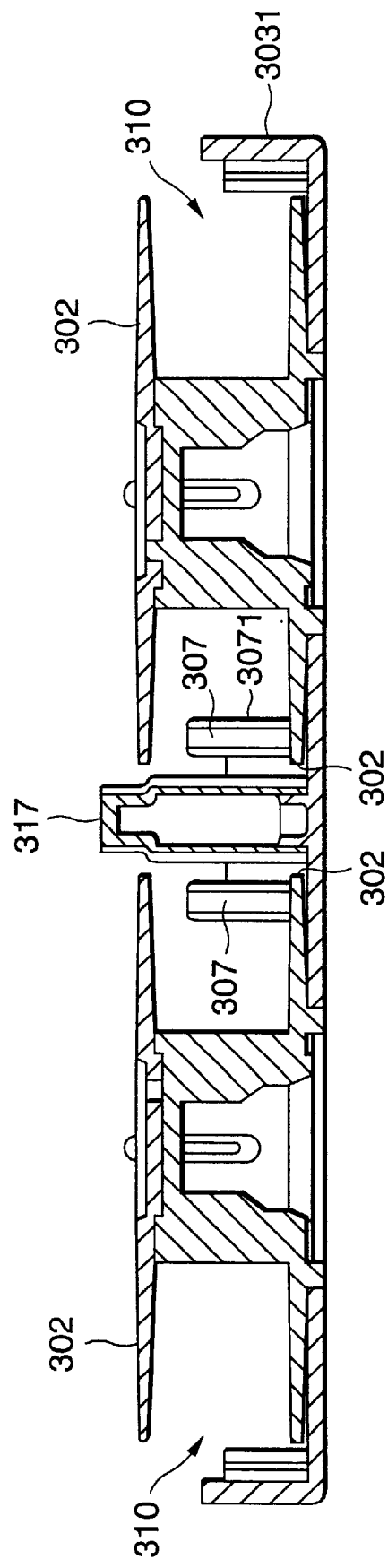
FIG. 19 is an enlarged sectional views taken along the line B—B of FIG. 18A.

Namely, as shown in FIGS. 17A, 17B, 18A and 18B, the brake releasing opening portion 313 and the regulating wall portions 309 are provided on the lower case 3031 at positions where the reel brake member 317 is attached, and the brake releasing member P penetrates into the opening hole portion 370 in the reel brake member 317 through this brake releasing opening portion 313. FIGS. 17A and 17B show the movement of the reel brake member 317 between the regulating wall portions 309 inside the case, in which FIG. 17A shows a brake state and FIG. 17B shows a brake released state. Even if the brake releasing member P is formed into a thin pin-like configuration, since there is provided the guide recessed portion 372, the brake releasing member P can be guided by this abutment side wall portion 371 so as to be securely positioned at a central portion of the reel brake member 317. Furthermore, this brake releasing member P penetrates to the vertical surface 3712 and thereafter it moves relatively rearward of the case, whereby the brake is released (FIG. 18B) from the brake state (FIG. 18A).

Figure 20A:
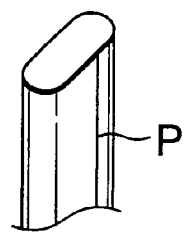
FIGS. 20A to 20C are enlarged perspective views showing a part of a brake release member used on a device side.
Figure 20B:
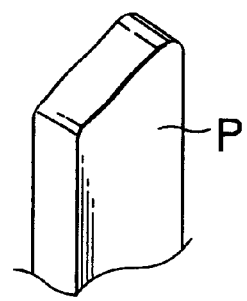
Figure 20C:
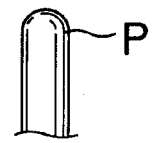
Figure 21A:
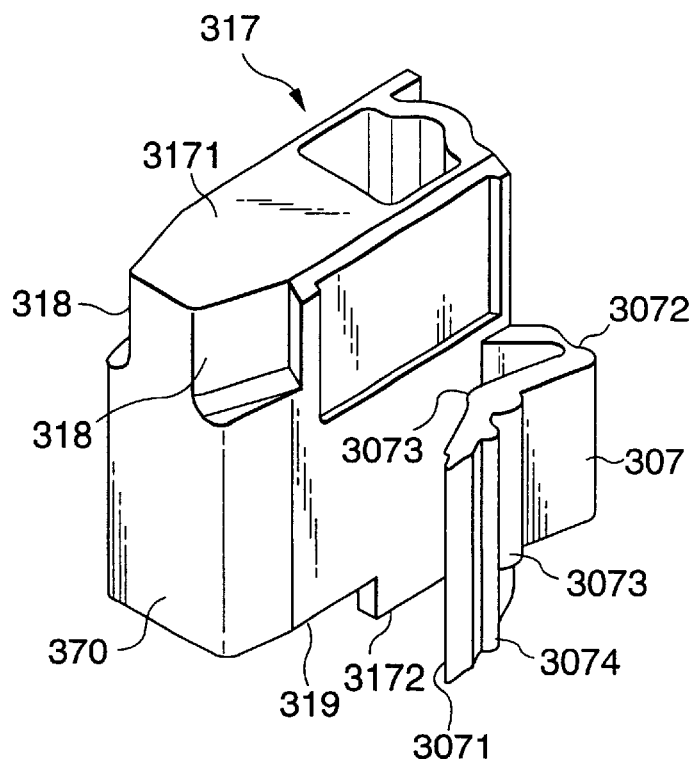
FIGS. 21A and 21B are enlarged perspective views of the brake member of the sixth embodiment of the invention.
Figure 21B:
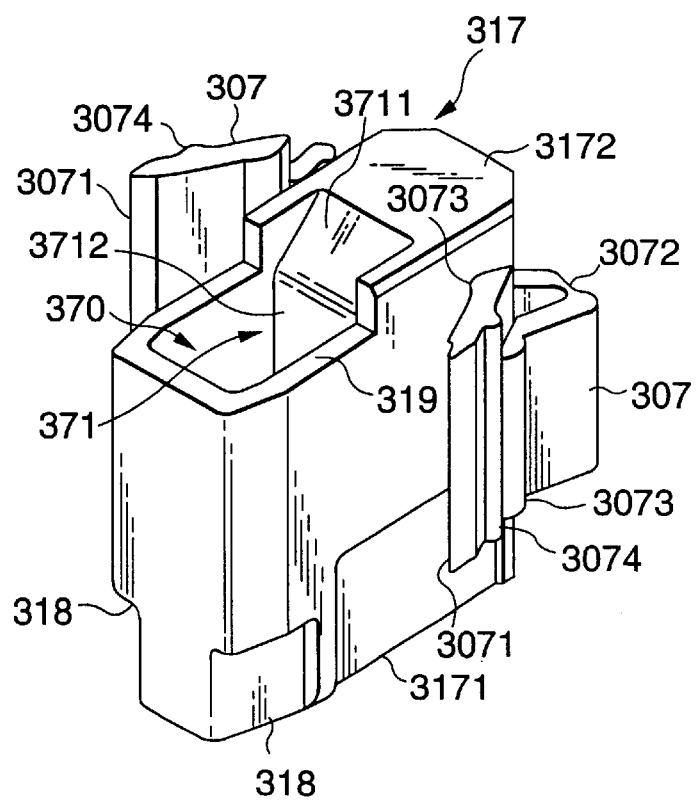
Figure 22A:
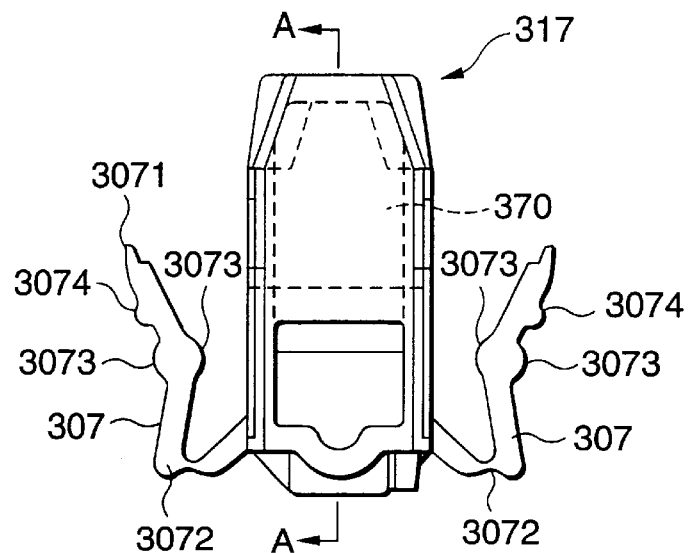
FIGS. 22A to 22C are enlarged views of the reel brake member shown in FIGS. 21A and 21B.
Figure 22B:
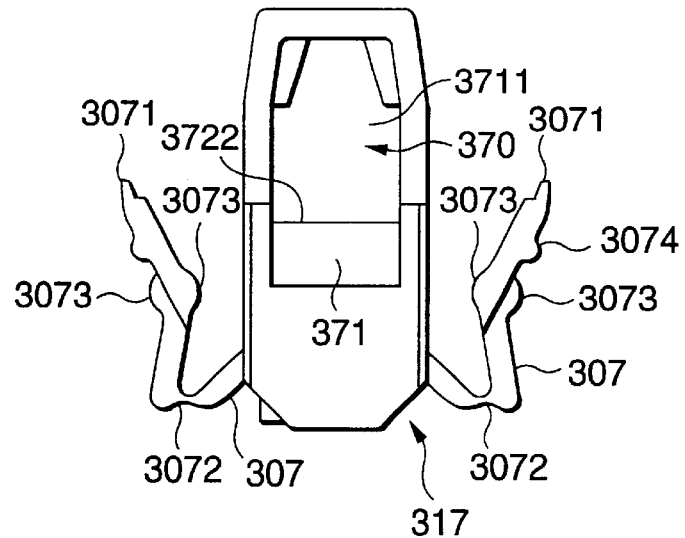
Figure 22C:
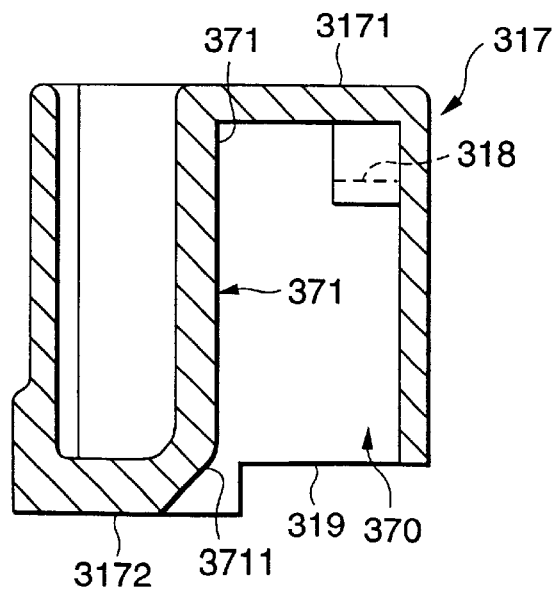
Figure 23A:
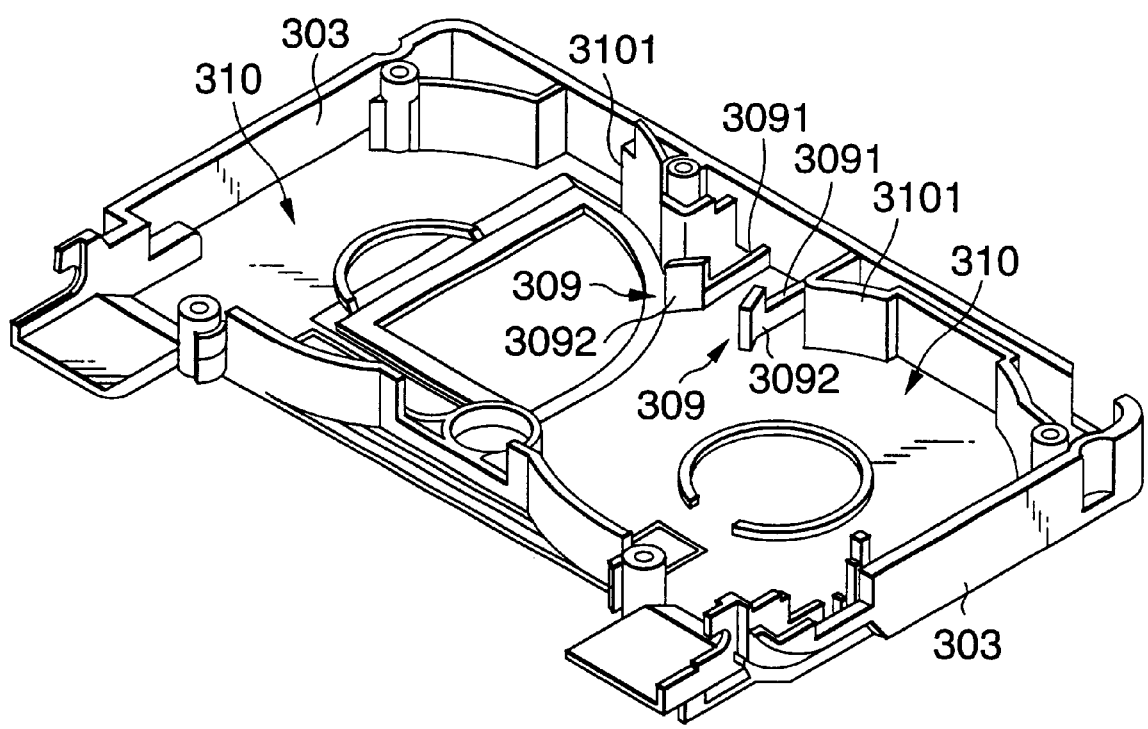
FIGS. 23A and 23B are perspective views showing an upper case and a lower case.
Figure 23B:
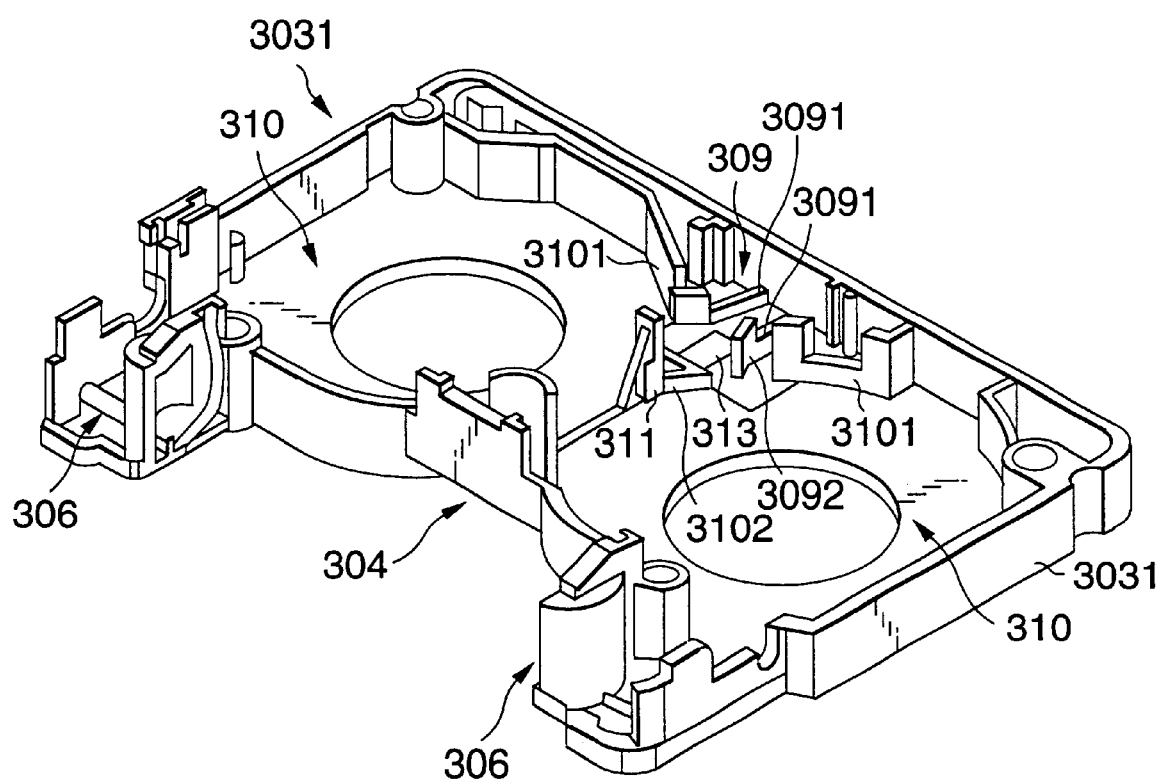
Figure 24A:
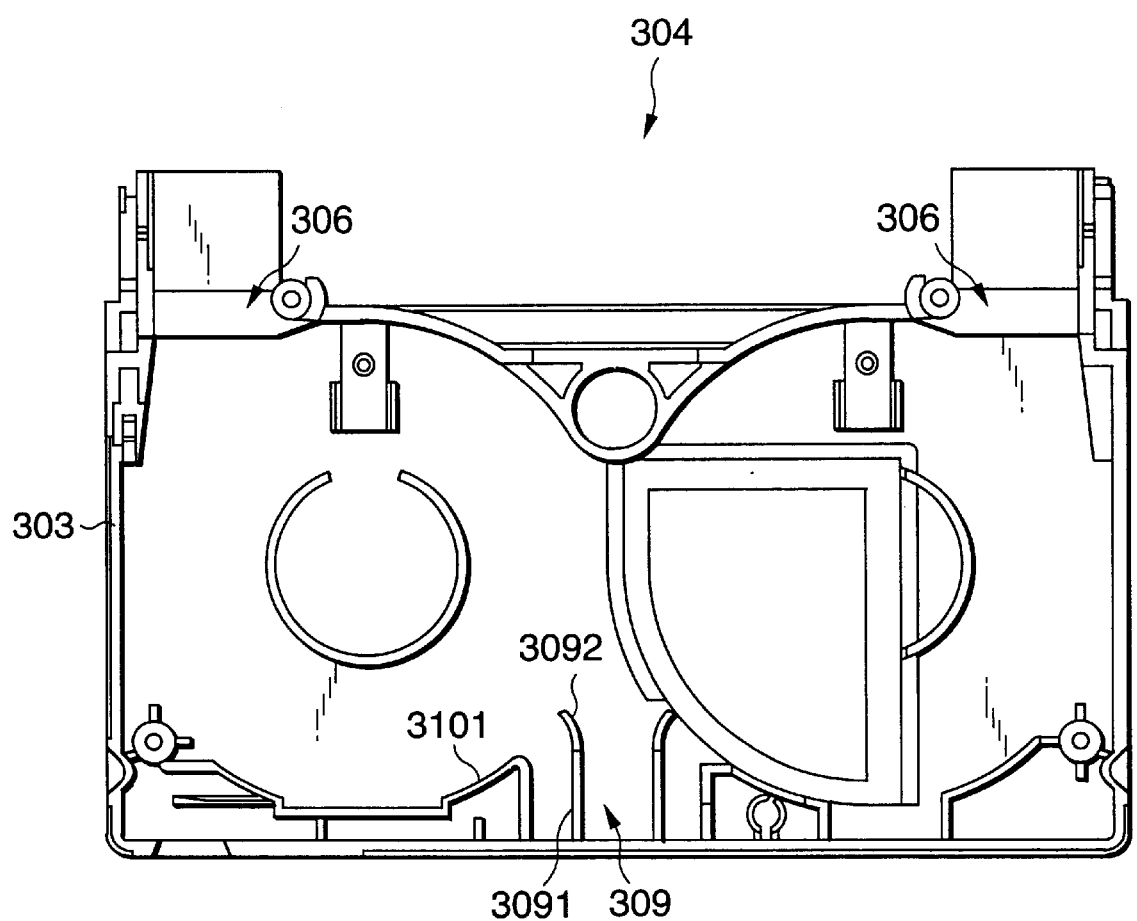
FIGS. 24A and 24B plan views of the case in FIGS. 23A and 23B.
Figure 24B:
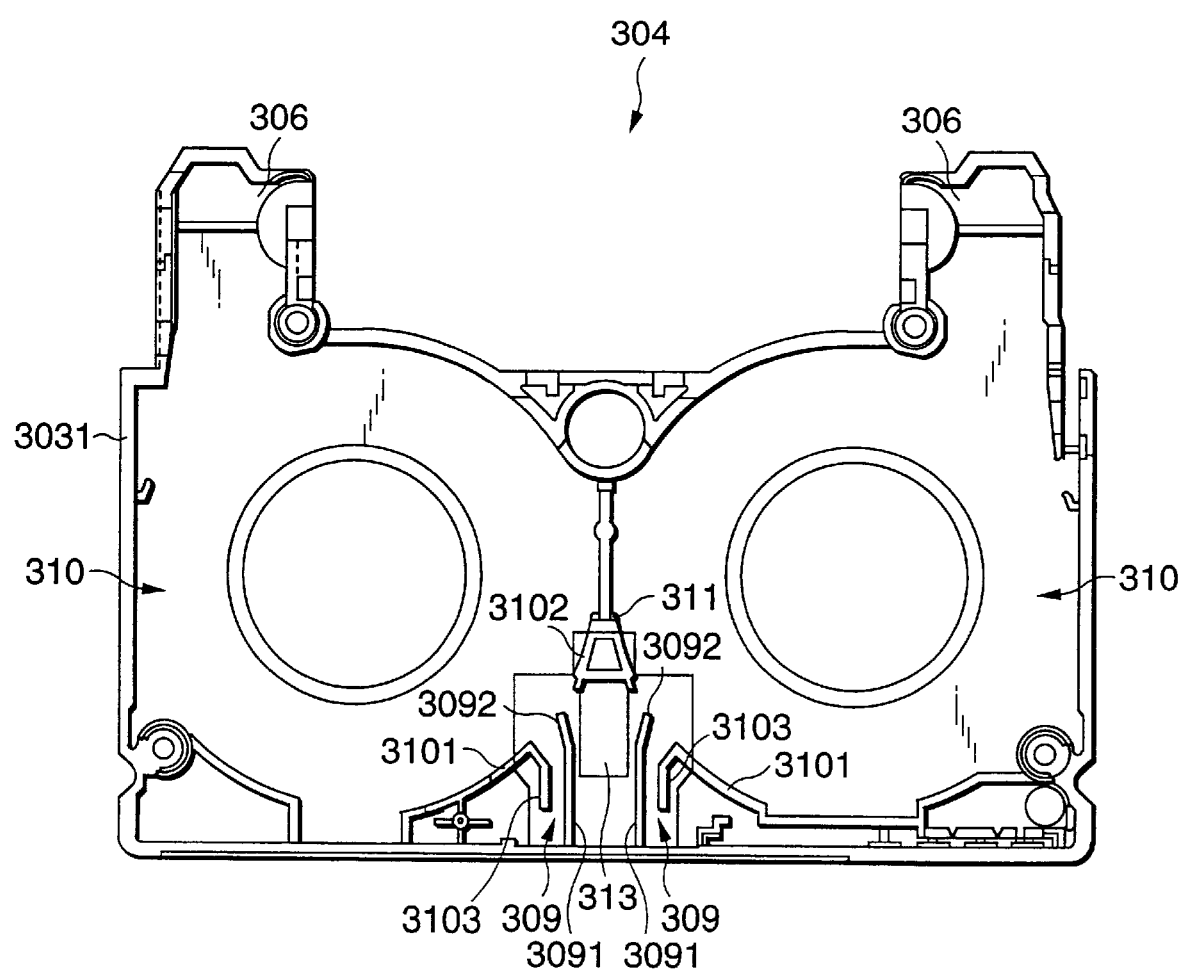

In this case, the brake release member P has an inclined surface on an upper surface thereof as shown in FIGS. 20A and 20B, and with a diameter of a certain magnitude, the brake can be released without relative movement of the brake release member P and the case. In addition, with the bottom of the guide recessed portion 372 being formed into a curved surface, brake release members of various diameters including that shown in FIG. 20C can be used and if both sides of the guide recessed portion 372 is left flat on both sides thereof, a brake release member P having a square pole like shape as shown in FIG. 20B can also conveniently be used.

Moreover, the aforesaid brake pawl 3071 comprises the projections 3073, 3074 provided on the arm 307 of the reel brake member 317 and the regulating wall portions 309, 3103 provided on the internal surface of the case in such a manner as to protrude therefrom so as to confront the projections 3073, 3074 on both sides thereof for regulating the sliding of the arms 307 of the reel brake member 317.

The regulating wall portion 309 for regulating the movement of the arm 307 is constituted by the linear guide rib 3091 oriented toward the back side of the case and the outwardly curved guide rib oriented toward the front side of the case. When the projection 3073 of the arm 307 collides with the curved guide rib 3092, the brake pawl 3071 is deployed so as to engage the teeth 3021 of the tape reel 302, whereby the rotation of the tape reel 302 in a direction in which the tape 301 is loosened is prevented, while in an opposite direction the brake pawls 3071 are guided by the linear guide paths to move toward a center between the two arms 307 while approaching each other. In other words, the projections 3074 of the arms 307 collide with the regulating wall portions 3103 to make the brake pawls 3071 operate in a closing direction.

Consequently, when the reel brake member 317 moves rearward of the tape cassette during a brake releasing operation, the brake pawls 3071 of the reel brake member 317 are guided from the curved guide paths to the linear guide paths of the regulating wall portions 309 for movement and then withdraw quickly from the reel areas 310. Then, the projections 3074 collide with the regulating wall portions 3103 so as to be guided thereby, and the brake pawls 3071 are then closed, thereby allowing the tape reels 302 to freely rotate.

In this case, the reel brake member 317 constitutes a regulating mechanism comprising the opening hole portion 370 functioning as the brake release operating portion exposed from the brake releasing opening portion 313 formed in the lower case 3031, the projections 3073, 3074 provided on the arms 307 for regulating the movement of the arms 307 of the feel brake member 317 in the brake releasing direction, the regulating wall portions 309, 3103 provided on the internal surface of the case in such a manner as to protrude therefrom so as to confront the projections 3073, 3074 on both sides thereof and oriented so as to face the inside and outside of the arms 307 for regulating the sliding of the arms 307 of the reel brake member 317 for further securement of the regulation.

In FIGS. 17A, 17B, 18A and 18B, when the tape cassette is not in use, the projections 3073 of the arms 307 collide with the regulating wall portions 309 so as to deploy the brake pawls 3071 and then the distal ends of the brake pawls 3071 enter between the teeth 3021 of the tape reels 302 to maintain a brake state, and on the contrary, when the cassette is in use, when the reel brake member 317 moves to a predetermined position, the projections 3074 of the arms 307 collide with the regulating wall portions 3103, and the brake pawls 371 are closed. The brake pawls 3071 of the reel brake member 317 also move in the brake releasing direction.

Consequently, the regulating wall portions 309 are provided on the lower case 3031 in such a manner as to protrude from a position where the movement of the brake arms 307 on the sides of the brake releasing opening portion 313 is regulated and to extend along partition walls 3101 in the reel areas 310, and the reel brake member 317 is operated by the brake releasing member P of the recording and reproducing device such as a cam rod. Moreover, with this construction, the brake pawls 3071 are allowed to move to a position where they are not allowed to disengage from the teeth 3021 on the outer circumferences of the lower flanges of the tape reels 302 when an impact is applied thereto when the tape cassette is not in use, and any further movement of the arms 307 of the reel brake member 317 may be regulated by the regulating wall portions 309.

The reel brake member 317 is disposed between the pair of tape reels 302 at a position closer to a side opposite to the side where the opening portion 304 is formed for exposing the tape 301 therefrom and has the brake pawls 3071 positioned at the distal ends of the pair of arms 307 for locking in the teeth 3021 provided on the outer circumferences of the lower flanges of the tape reels 302 and the brake release operating portion provided with the inclined surface 3711 facing the brake releasing opening portion 313 into which the brake release member P of the recording and reproducing device is inserted. The reel brake member 317 is provided such that it more smoothly slides for movement between the outer circumferential ribs of the partition walls 3101 of the pair of reel areas 310 that are provided on the case in such a manner as to protrude therefrom.

The brake pawl 3071 of the reel brake member 317 is constructed so as to be resiliently deformed via the arm 307 at the recessed and thinned resilient hinge portion 3072 and is biased by the spring 314 in the direction in which it is brought into engagement with the teeth 3021 provided on the outer circumference of the lower flange of the tape reel 302. The thinned hinge portion 3072 provides an impact absorption effect through resilient deformation. In other words, when a tape cassette drop impact is exerted, even if a force is exerted by the pair of heavy tape reels 302 for moving the reel brake member 317 in the releasing direction, an impact force due to the tape reels 302 is absorbed by the thinned hinge portions 3072 of the brake pawls 3071 of the reel brake member 317 so as to alleviate the force acting on the reel brake member 317, this serving to prevent the brake pawls 3071 from biting into the teeth 3021 on the outer circumferences of the lower flanges of the tape reels 302.

In addition, when the reel brake member 317 is moved by an impact force being exerted thereon, the brake pawls 3071 are deployed outwardly by virtue of a restoring force and engage the regulating wall portions 309 of the case in such a manner as to be hooked thereon while maintaining the engagement with the teeth 3021 on the outer circumferences of the lower flanges of the tape reels 302 to thereby restrict the movement of the arms 307 of the reel brake member 317. In a normal state, however, the brake pawls 3071 and the teeth 3021 on the tape reels 302 are in engagement with each other and such an engagement is constructed so as not to be disengaged.

The regulating wall portion 309 is constructed so as to prevent the arm 307 of the reel brake member 317 from deflecting inwardly of the brake so as to prevent in turn the brake pawl 3071 from disengaging from the reel area 310 and the reel brake member 317 is constructed such that the arms 307 of the reel brake member 317 are closed inwardly at a position near the brake releasing position so as to disengage the brake pawls 3071 from the reel areas 310.

The regulating wall portion 309 for regulating the movement of the arm 307 of the reel brake member 317 is formed into a curved configuration in which the front thereof is expanded to both sides. With this construction, even if the brake pawls 3071 are deflected inwardly by an external impact when the tape cassette is not in use, there is caused no risk of the brake being released by the regulating wall portions 309, and in addition, even if the reel brake member 317 is moved rearward a bit by the impact, since the brake pawls 3071 are constructed so as to be press deployed outwardly, there is caused no risk of producing a looseness of the tape 301.

Furthermore, even when the reel brake member 317 moves rearward when the tape cassette is in use, since the projections 3074 on the arms 307 having the brake pawls 3071 provided thereon are brought into abutment with and act on the regulating wall portions 3103, the engagement with the tape reels 302 can be disengaged at all times for free rotating operation of the tape reels 302. It is preferable to have a brake construction in which even when the reel brake member 317 moves and approaches the brake releasing position, the brake pawls 3071 operate so as to quickly move in a radial direction of the tape reel 302 to thereby perform a secure brake operation so that the tape 301 becomes free of a looseness.

The regulating wall portions 309, 3103 for regulating the movement of the arms 307 are provided on the lower case 3031, but they may be provided on the upper case 303.

In addition, in order to prevent the production of a looseness of the tape 301 in a securer fashion, a mode is effective in which the brake pawls 3071 are biased in a direction in which the tape 301 is wound up tightly. With this construction, when the reel brake member 317 engages the teeth 3021 on the outer circumferences of the lower flanges of the tape reels 302, the tape reels 302 rotate in the direction in which the tape 301 is wound up tightly, even if the tape cassette is put in the recording and reproducing device in a wrong way or it is put in and out of the device repeatedly, there is produced no looseness of the tape 301.

In the drawings, reference numeral 311 denotes a position regulating rib, and reference numeral 320 denotes a spring for pressingly supporting the tape reels 302. Reference numerals 321, 322, 323, and 324 denote a lid lock, a plug, an MIC detecting portion, and an optical cover, respectively.

The present invention provides a tape cassette comprising a pair of tape reels around which a tape is wound rotatably received in a case, the tape being disposed so as to extend from one of the tape reels through a front of the cape to the other tape reel to be wound up therearound, and a reel brake member having brake pawls for suppressing the rotation of the tape reels and provided so as to freely slide for engagement with and disengagement from teeth of the tape reels for braking operation and brake releasing operation, respectively, the reel brake member being biased by a spring toward a tape reels side, wherein a main body of the reel brake member comprises an opening hole portion for insertion of a brake release member provided on a device side, and wherein a guide recessed portion is formed at a center of an abutment side wall portion of the brake release member within the opening hole portion for guiding the brake release member. With the tape cassette of the present invention constructed as described above, even when there are available on the device side different devices having different brake release members, it is possible to press, at all times, for operation a central portion of a brake release member in use to effect a smooth brake release operation. The normal brake function can also be maintained and there is caused no problem in using. Moreover, even when a strong external force is exerted which results from a strong impact such as a drop impact, the reel brake is prevented from being disengaged, and the production of a looseness of a tape can also be prevented. This helps prevent the generation of damage to a tape due to a cassette failure that would happen when it is mounted for use in a recording and reproducing device, whereby a highly reliable brake operation can be obtained. Moreover, a good assembling capability can be provided, and therefore the productivity can be increased. The handling of a cassette tape is also facilitated. Also, the tape cassette according to the present invention can be used with a recording and reproducing device adapted to use a conventional tape cassette without any modification. Thus, the tape cassette of the present invention can be used for various types of recording and reproducing devices without requiring a change in the type of a device available.

Sixth Embodiment

Referring to FIGS. 21 to 27, a sixth embodiment of the present invention will be described. A tape cassette according to the sixth embodiment comprises a pair of tape reels 302 around which a tape 301 is wound rotatably received in a case comprising upper and lower cases 303, 3031, the tape 301 being constructed to extend from one of the tape reels 302, pass through a front of the case and be wound up around the other tape reel 302, an opening portion 304 formed for allowing the tape 301 extending along the front of the case to be exposed therefrom, a lid member comprising a front lid 305 for covering a front of the tape 301 situated inside the opening portion 304, an upper lid 3051 for covering an upper surface of the tape 301 and a rear lid 3052 for covering a back of the tape 301 and adapted to be freely opened and/or closed by means of a lid opening and/or closing mechanism, tape exit and entrance 306 provided for pulling out the tape 301 and a reel brake member 317 comprising a pair of arms 307 each laving a brake pawl 3071 for suppressing the rotation of the tape reels 302 and adapted to freely be slid in back and forth directions for engagement with and/or disengagement from teeth 3021 on outer circumferences of lower flanges of the tape reels 302 (see FIG. 13).

As shown in FIGS. 21A, 21B, and 22A to 22C, the reel brake member 317 has the arms 307 disposed so as to be connected to sides of a main body thereof at hinge portions 3072, which arms each have the brake pawl 3071 at a distal end thereof. Pin-like projections 3073, 3074 are provided at substantially intermediate positions between the brake pawl 3071 of the arm 307 and the hinge 20 portion 3072, and the arms 307 are pushed forward by means of springs 14 thereat at all times so that the brake pawls 3071 are constructed so as to engage the teeth 3021 of the tape reels 302, whereby the tape reels 302 are prevented from rotating (see FIG. 13).

In addition, an opening hole portion 370 is formed in a 25 lower surface 3172 of the main body of the reel brake member 317 for a brake release maneuvering member P provided on a device side to be inserted thereinto. The main body of the reel brake member 317 further comprises an upper surface portion 3171 and a lower surface portion 3172 which are adapted to slide over internal sides of the upper and lower cases 303, 3031, and recessed portions 318 are formed on sides of the front of the upper surface portion 3171 at positions corresponding to outer circumferential edges of the tape reels 302. A butt recessed portion 319 is formed in the lower surface portion 3172 on the front side thereof in such a manner as to correspond to a brake holding rib 3102 provided on a front side of a reel brake sliding area on the lower case 3031 along a tape reel receiving area or reel area 310 (FIGS. 21A to 23B).

Furthermore, regulating wall portions 309 for regulating the sliding of the arms 307 of the reel brake member 317 are provided on the internal surfaces of the upper and lower cases 303, 3031 in such a manner as to protrude therefrom, and the regulating wall portions 309 each comprise a linear guide rib 3091 oriented toward a back side of the case and a curved guide rib 3092 provided so as to extend outwardly toward the front side of the case. The curved guide ribs 3092 are formed higher than the linear guide ribs 3091 (FIGS. 23A to 24B).

In addition, in the reel brake member 317, an abutment side wall portion 371 for the brake releasing member P provided on a device side is formed in the opening hole portion 370 into which the brake releasing member P is inserted. This abutment side wall portion 371 for the brake releasing member P has an inclined surface 3711 formed on a lower side thereof and a vertical surface 3712 on an upper side thereof, and a flat surface portion is formed on a side along which the brake releasing member P is fittingly inserted, but as required a guide recessed portion (not shown) may be formed to a position to which the brake releasing member P is allowed to penetrate. Then, when the brake releasing member P provided on a device side is inserted from an brake releasing opening portion 313 formed in the lower case 3031, the reel brake member 317 having formed therein the opening hole portion 370 facing the brake releasing opening portion 313 is securely and smoothly moved rearwardly, whereby the brake is released.

Figure 25A:
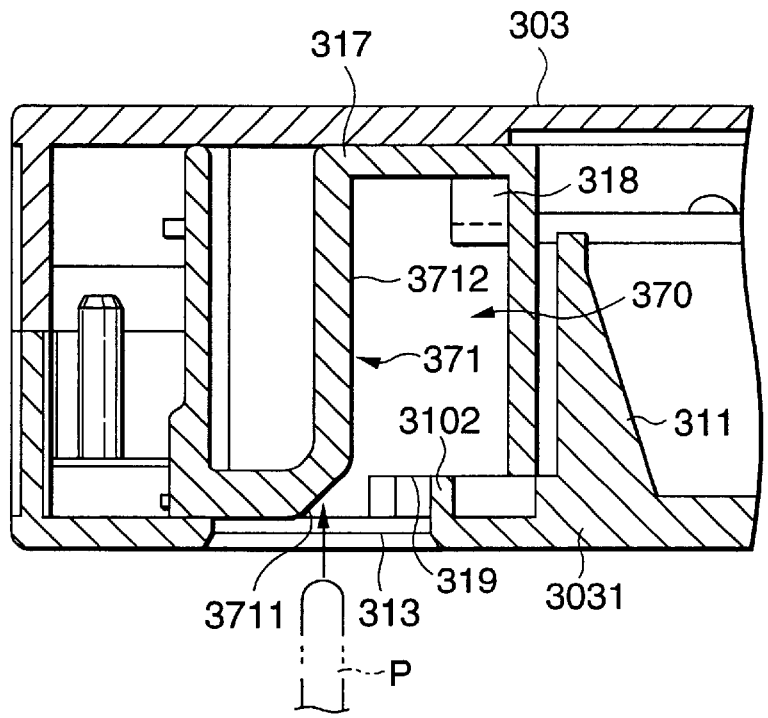
FIGS. 25A and 25B are operation views in which a reel brake member is mounted on the case shown in FIGS. 23A and 23B.
Figure 25B:
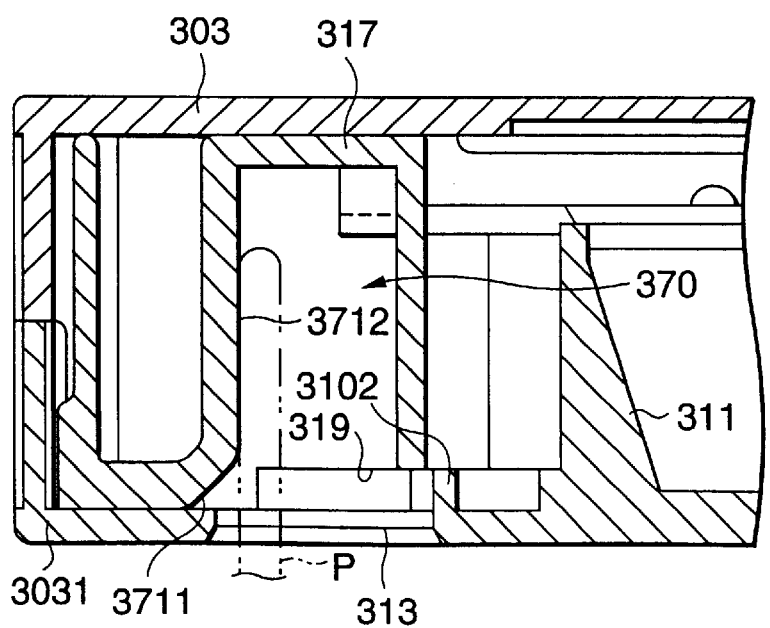
Figure 26A:
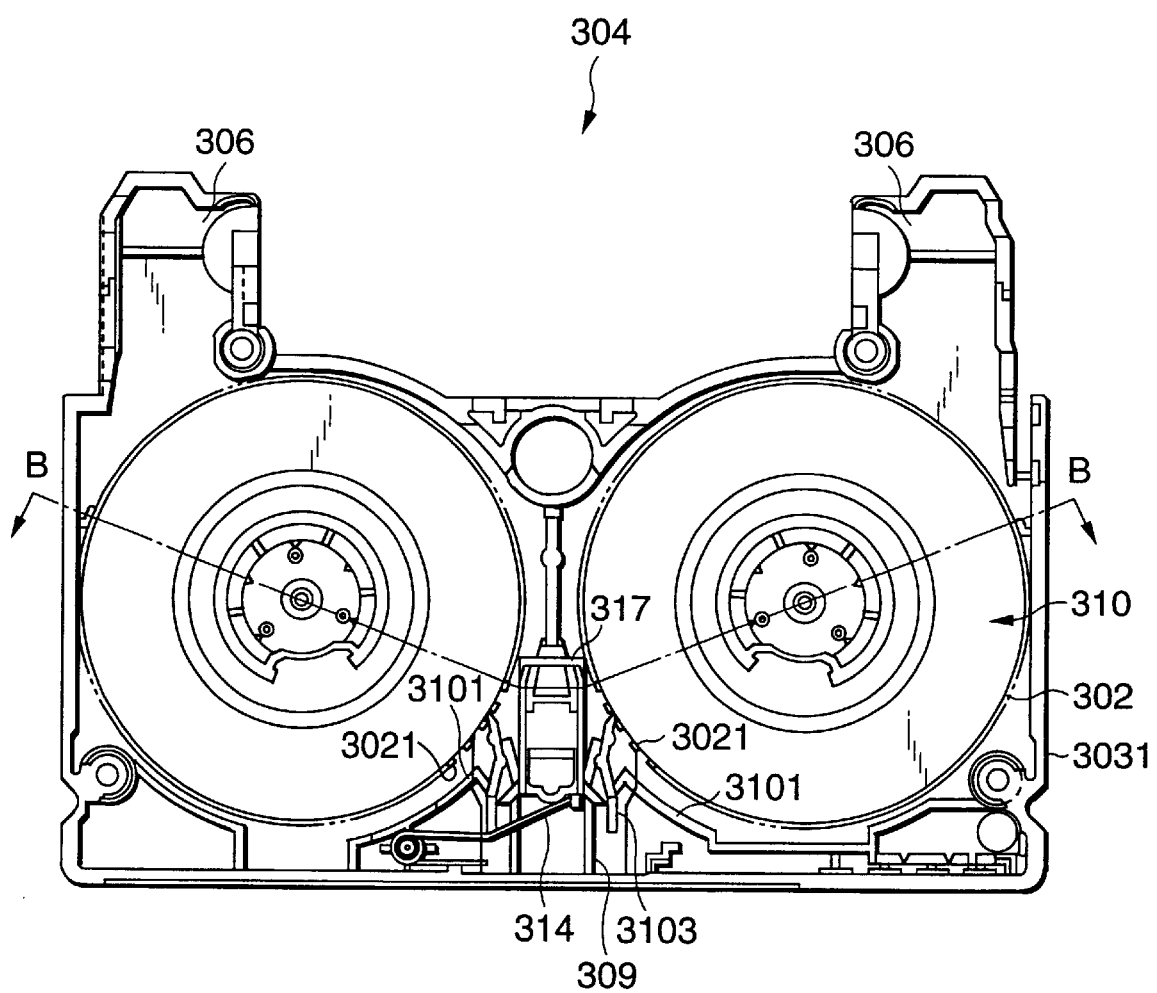
FIGS. 26A and 26B are operational views in which the reel brake member as shown FIGS. 24A and 24B.
Figure 26B:
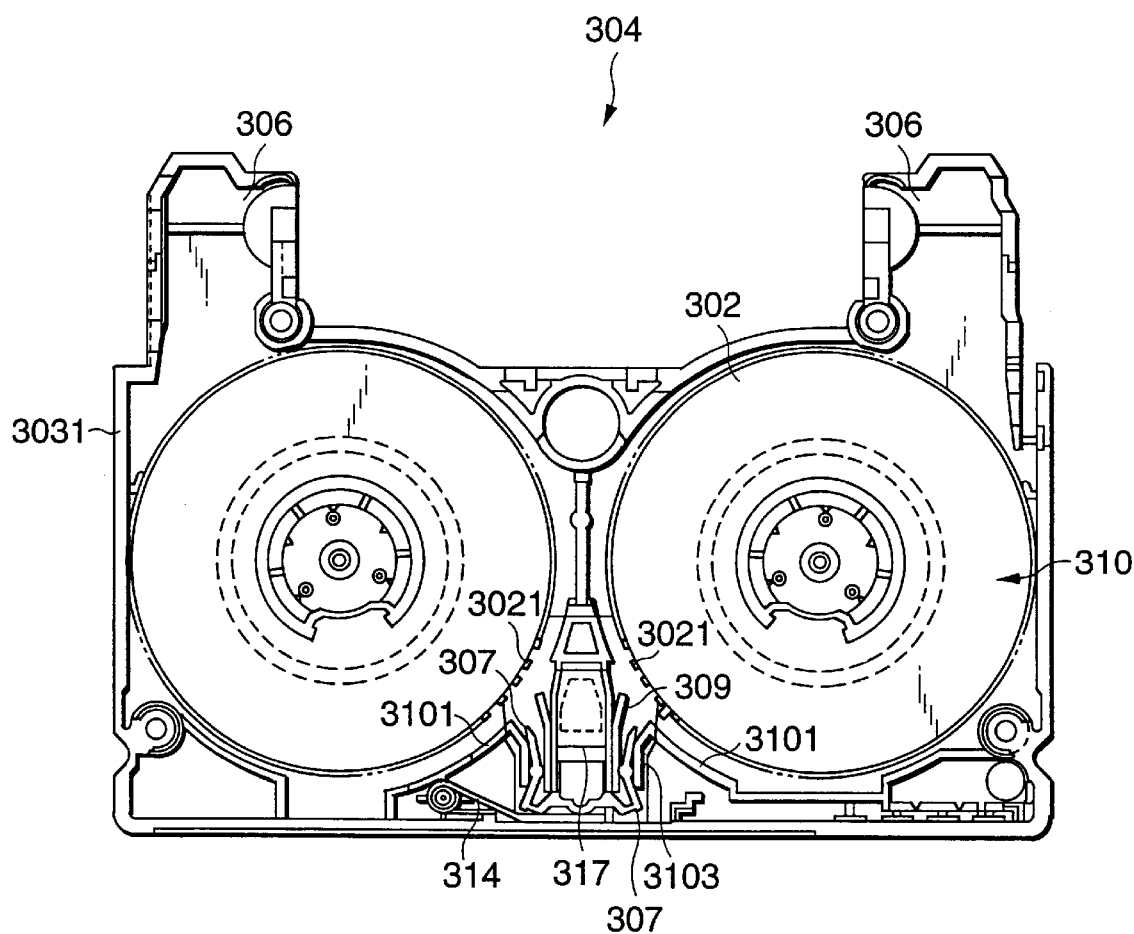
Figure 27:
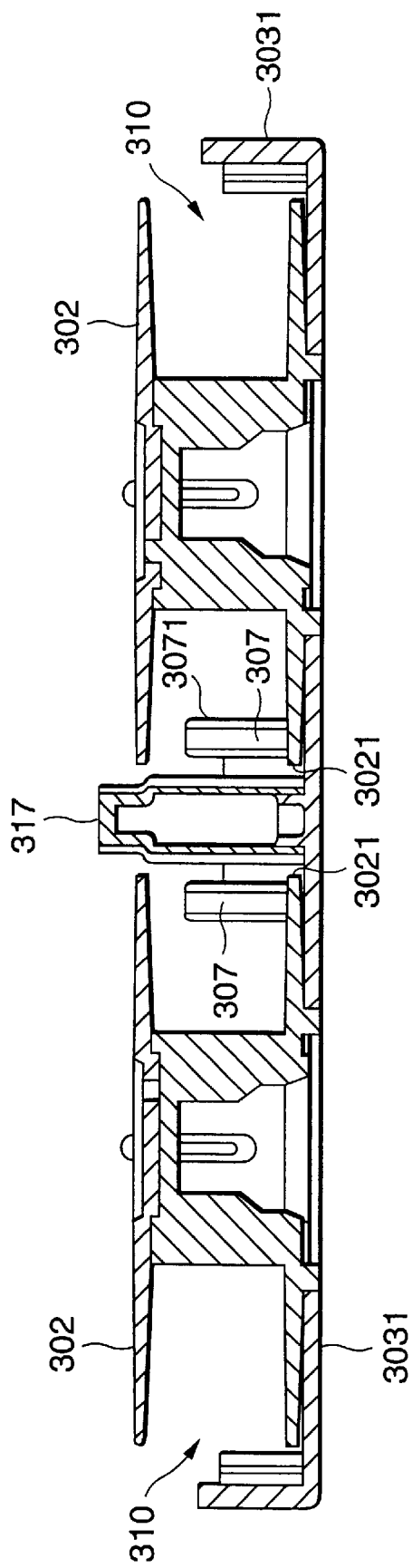
FIG. 27 is an enlarged sectional views taken along the line B—B of FIG. 26A.
Figure 28A:
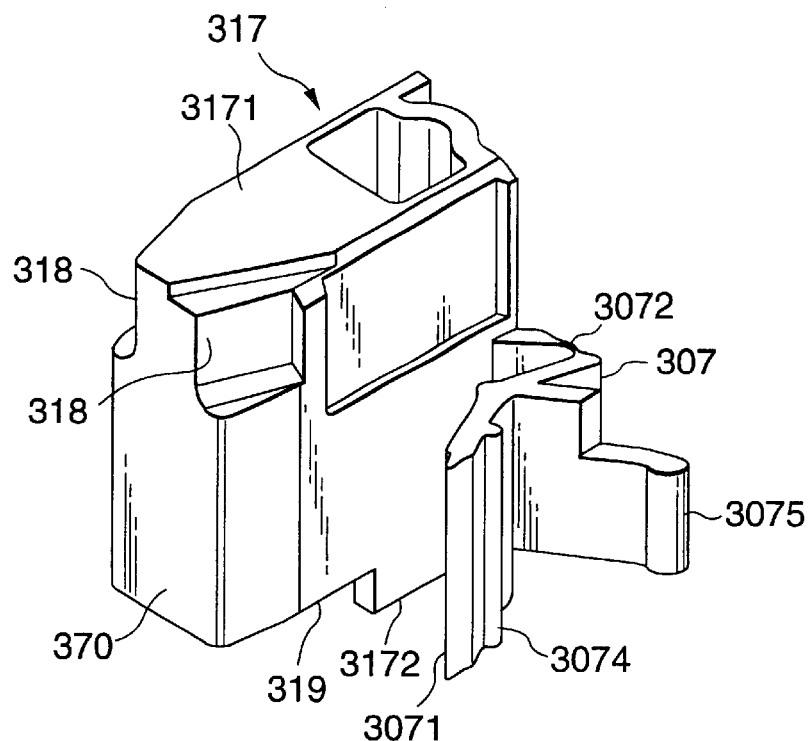
FIGS. 28A and 28B are an enlarged perspective views of a reel brake member according to seventh embodiment of the present invention.
Figure 28B:
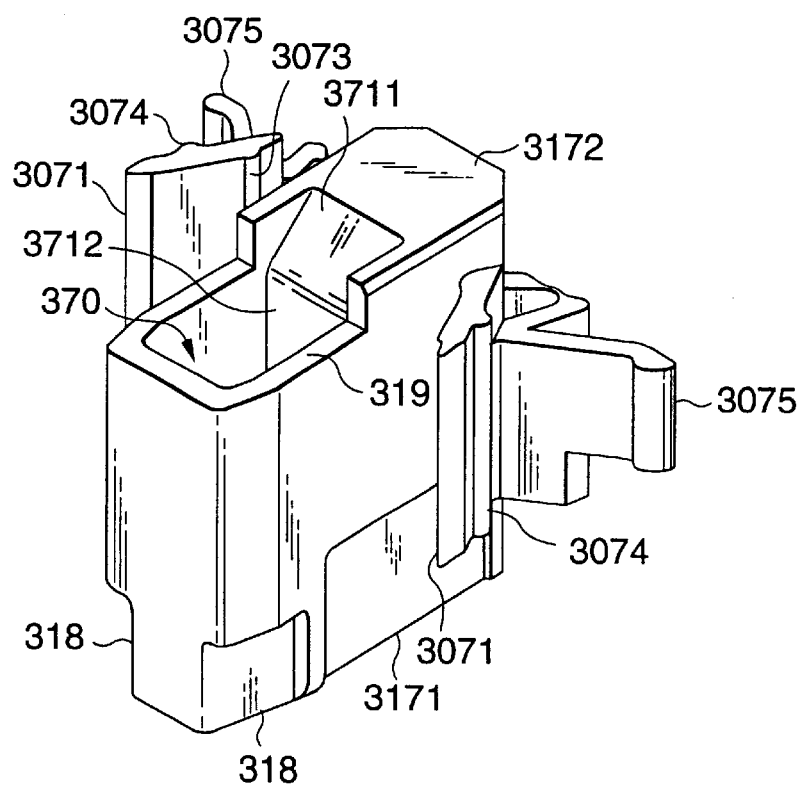
Figure 29A:
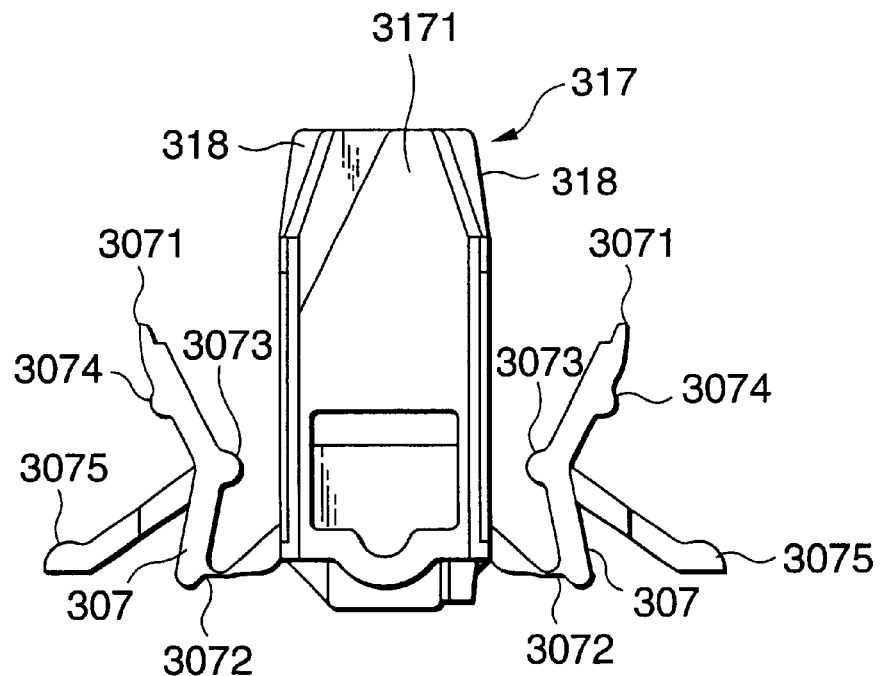
FIGS. 29A and 29B are views showing the example of FIGS. 28A and 28B.
Figure 29B:
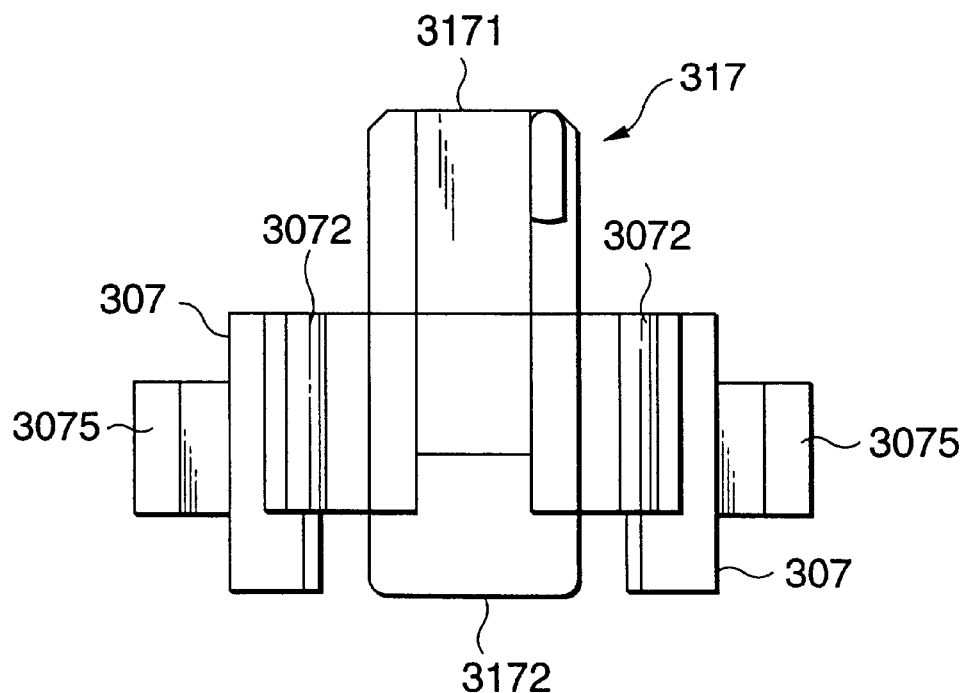

Namely, as shown in FIGS. 25A to 26B, the brake releasing opening portion 313 and the regulating wall portions 309 are provided on the lower case 3031 at positions where the reel brake member 317 is attached, and the brake releasing member P penetrates into the opening hole portion 370 in the reel brake member 317 through this brake releasing opening portion 313. FIGS. 25A and 25B show the movement of the reel brake member 317 between the regulating wall portions 309 inside, the case, in which FIG. 25A shows a brake state and FIG. 25B shows a brake released state. Even if the brake releasing member P is formed into a thin pin-like configuration, since there is provided the abutment side wall portion 371, the brake releasing member P can be guided by this abutment side wall portion 371 so as to be securely positioned at a central portion of the reel brake member 317. Furthermore, this brake releasing member P penetrates to the vertical surface 3711 and thereafter it moves relatively rearward of the case, whereby the brake is released (FIG. 26B) from the brake state (FIG. 26A).

Moreover, the aforesaid brake pawl 3071 comprises the projections 3073, 3074 provided on the arm 307 of the reel brake member 317 and the regulating wall portions 309, 3103 provided on the internal surface of the case in such a manner as to protrude therefrom so as to confront the projections 3073, 3074 on both sides thereof for regulating the sliding of the arms 307 of the reel brake member 317.

The regulating wall portion 309 for regulating the movement of the arm 307 is constituted by the linear guide rib 3091 oriented toward the back side of the case and the outwardly curved guide rib 3092 oriented toward the front side of the case. When the projection 3073 of the arm 307 collides with the curved guide rib 3092, the brake pawl 3071 is deployed so as to engage the teeth 3021 of the tape reel 302, whereby the rotation of the tape reel 302 in a direction in which the tape 301 is loosened is prevented, while in a rearward direction of the cassette the brake pawls 3071 are guided by the linear guide paths to move toward a center between the two arms 307 while approaching each other. In other words, the projections 3074 of the arms 307 collide with the regulating wall portions 3103 to make the brake pawls 3071 operate in a closing direction.

Consequently, when the reel brake member 317 moves rearward of the tape cassette during a brake releasing operation, the brake pawls 3071 of the reel brake member 317 are guided by the linear guide paths so as to move along the regulating wall portions 3103 and then withdraw quickly from the reel areas 310. Then, the projections 3074 collide with the regulating wall portions 3103 so as to be guided thereby, and the brake pawls 3071 are then closed, thereby allowing the tape reels 302 to freely rotate.

In this case, the reel brake member 317 constitutes a regulating mechanism comprising the opening hole portion 370 functioning as the brake release operating portion exposed from the brake releasing opening portion 313 formed in the lower case 3031, the projections 3073, 3074 provided on the arms 307 for regulating the movement of the arms 307 of the reel brake member 317 in the brake releasing direction, the regulating wall portions 309, 3103 provided on the internal surface of the case in such a manner as to protrude therefrom so as to confront the projections 3073, 3074 on both sides thereof and oriented so as to face the inside and outside of the arms 307 for regulating the sliding of the arms 307 of the reel brake member 317 for further securement of the regulation.

In FIGS. 25A to 26B, when the tape cassette is not in use, the projections 3073 of the arms 307 collide with the curved guide ribs 3092 so as to deploy the brake pawls 3071 and then the distal ends of the brake pawls 3071 enter between the teeth 3021 of the tape reels 302 to produce a brake state, and on the contrary, when the cassette is in use, when the reel brake member 317 moves to a predetermined position, the projections 3074 of 5 the arms 307 collide with the regulating wall portions 3103, and the brake pawls 3071 are closed. The brake pawls 3071 of the reel brake member 317 also move in the brake releasing direction.

Consequently, the regulating wall portions 309 are provided on the lower case 3031 in such a manner as to protrude from a position where the movement of the brake arms 307 on the sides of the brake releasing opening portion 313 is regulated and to extend along partition walls 3101 in the reel areas 310 or locking ribs, and the brake pawls 3071 are provided at positions away by a distance over which the brake pawls 3071 can move in a state in which the brake pawls 3071 are in engagement with the teeth 3021 on the outer circumferences of the lower flanges of the tape reels 302, whereby the reel brake member 317 is operated by the brake releasing member P of the recording and reproducing device such as a cam rod. Moreover, with this construction, the brake pawls 3071 are allowed to move to a position where they are not allowed to disengage from the teeth 3021 on the outer circumferences of the lower flanges of the tape reels 302 when an impact is applied thereto when the tape cassette is not in use, and any further movement of the arms 307 of the reel brake member 317 may be regulated by the regulating wall portions 309.

The reel brake member 317 is disposed between the pair of tape reels 302 at a position closer to a side opposite to the side where the opening portion 304 is formed for exposing the tape 301 therefrom and has the brake pawls 3071 positioned at the distal ends of the pair of arms 307 for locking in the teeth 3021 provided on the outer circumferences of the lower flanges of the tape reels 302 and the brake release operating portion provided with the inclined surface 3711 facing the brake releasing opening portion 313 into which the brake release member P of the recording and reproducing device is inserted. The reel brake member 317 is provided such that it more smoothly slides for movement between the outer circumferential ribs of the partition walls 3101 of the pair of reel areas 310 that are provided on the case in such a manner as to protrude therefrom.

The brake pawl 3071 of the reel brake member 317 is constructed so as to be resiliently deformed via the arm 307 at the recessed and thinned resilient hinge portion 3072 and is biased by the spring 314 in the direction in which it is brought into engagement with the teeth 3021 provided on the outer circumference of the lower flange of the tape reel 302. The thinned hinge portion 3072 provides an impact absorption effect through resilient deformation. In other words, when a tape cassette drop impact is exerted, even if a force is exerted by the pair of heavy tape reels 302 for moving the reel brake member 317 in the releasing direction, an impact force due to the tape reels 302 is absorbed by the thinned hinge portions 3072 of the brake pawls 3071 of the reel brake member 317 so as to alleviate the force acting on the reel brake member 317, this serving to prevent the brake pawls 3071 from biting into the teeth 3021 on the outer circumferences of the lower flanges of the tape reels 302.

In addition, when the reel brake member 317 is moved by an impact force being exerted thereon, the brake pawls 3071 are deployed outwardly by virtue of a restoring force and engage the regulating wall portions 309 of the case in such a manner as to be hooked thereon while maintaining the engagement with the teeth 3021 on the outer circumferences of the lower flanges of the tape reels 302 to thereby restrict the movement of the arms 307 of the reel brake member 317. In a normal state, however, the brake pawls 3071 and the teeth 3021 on the tape reels 302 are in engagement with each other and such an engagement is constructed so as not to be disengaged.

The regulating wall portion 309 is constructed so as to prevent the arm 307 of the reel brake member 317 from deflecting inwardly of the brake so as to prevent in turn the brake pawl 3071 from disengaging from the reel area 310 and the reel brake member 317 is constructed such that the arms 307 of the reel brake member 317 are closed inwardly at a position near the brake releasing position so as to disengage the brake pawls 3071 from the reel areas 310.

The regulating wall portion 309 for regulating the movement of the arm 307 of the reel brake member 317 is formed into a curved configuration in which the front thereof is expanded to both sides, and another regulating wall portion 309 may be provided on the upper case 303 at a position confronting the regulating wall portion 309 on the lower case 3031, the regulating wall portion 309 on the upper case 303 being made higher than the lower case 3031. With this construction, even if the brake pawls 3071 are deflected inwardly by an external impact when the tape cassette is not in use, there is caused no risk of the brake being released, and in addition, even if the reel brake member 317 is moved rearward a bit by the impact, since the brake pawls 3071 are constructed so as to be press deployed outwardly, there is caused no risk of producing a looseness of the tape 301.

Furthermore, even when the reel brake member 317 moves rearward when the tape cassette is in use, since the projections 3074 on the arms 307 having the brake pawls 3071 provided thereon are brought into abutment with and act on the regulating wall portions 3103, the engagement with the tape reels 302 can be disengaged at all times for free rotating operation of the tape reels 302. It is preferable to have a brake construction in which enven when the reel brake member 317 moves and approaches the brake releasing position, the brake pawls 3071 operate so as to quickly move in a radial direction of the tape reel 302 to thereby perform a secure brake operation so that the tape 301 becomes free of a looseness.

The regulating wall portions 309, 3103 for regulating the movement of the arms 307 are provided on the lower case 3031, but they may be provided on the upper case 303.

In addition, in order to prevent the production of a looseness of the tape 301 in a securer fashion, a mode is effective in which the brake pawls 3071 are biased in a direction in which the tape 301 is wound up tightly. With this construction, when the reel brake member 317 engages the teeth 3021 on the outer circumferences of the lower flanges of the tape reels 302, the tape reels 302 rotate in the direction in which the tape 301 is wound up tightly, even if the tape cassette is put in the recording and reproducing device in a wrong way or it is put in and out of the device repeatedly, there is produced no looseness of the tape 301.

The regulating wall portions 309 with which the arms 307 of the reel brake member 317 are brought into sliding abutment are provided continuously with the outer circumferential ribs of the partition walls 3101 provided along the tape reel receiving areas 310, and brake holding ribs 3102 are provided at a substantially central position between the tape reel receiving areas 310 in such a manner as to protrude therefrom and are disposed so as to be connected to positioning regulating walls or ribs 311 provided on the lower case 3031 in such a manner as to protrude therefrom.

The brake releasing opening portion 313 for insertion of a brake releasing pin is formed at a portion of the lower case 3031 where the reel brake member 317 is disposed, and the brake holding ribs 3102 are formed on the front side of this brake releasing opening portion 313. Furthermore, the position regulating walls or ribs 311 are provided forwardly of the brake holding ribs 3102 for regulating the forward position of the reel brake member 317.

In addition, the regulating wall portions 309 for the reel brake member 317 are formed on the sides of the brake releasing opening portion 313 on the rear side of the tape cassette. The distally expanded curved guide ribs 3092 are provided on the front side of the linear guide ribs 3091 and ribs for closing the brake pawls 3071 are provided, on the outer sides of the brake pawls 3071.

The recessed portion 319 in the lower surface portion 3172 of the reel brake member 317 is constructed so as to slide over the brake holding ribs 3102 on the lower case 3031. Since the brake holding ribs 3102 are higher than the thickness of the lower flange, even if the tape reels 302 are moved inside the case, the lower flanges are only brought into abutment with the brake holding ribs 3102, and there is no chance for them to come into abutment with the reel brake member 317. Similarly, the recessed portion 318 in the upper surface portion 3171 is configured so as not to be brought into abutment with the upper flange.

With this construction, there is no risk of the reel brake member 317 being moved by the flange. In addition, the regulating wall portions 309 guide only the rear portion of the reel brake member 317 at the brake position. With this construction, the brake main body can rotate in transverse directions, and this allows the reel brake member 317 to move so as to follow the movement of the tape reels 302, a more reliable brake mechanism being thereby provided.

With the projections 3073, 3074 provided on the arms 307 each having the brake pawl 3071 provided thereon, in the brake state, the projections 3073 abut with the curved guide ribs 3092, whereby the brake pawls 3071 are deployed so as to maintain a secure brake state, and in the brake released state, the projections 3074 abut with the regulating wall portions 3103, whereby the brake pawls 3071 are closed so as to securely be disengaged from the reel areas 310.

In this embodiment, the brake pawls 3071 are opened and/or closed by the projections 3073, 3074 formed on the reel brake member 317 and the regulating wall portions 309, 3103, but the ribs may be configured otherwise so that no projection is provided on the brake pawls 3071.

In the braking state, in order to allow the reel brake member 317 to rotate in the transverse directions, a slight gap is formed between the reel brake member 317 and the position regulating wall or ribs 311. (These position regulating walls or ribs 311 are not such that they function after the tape cassette has been assembled, but are such that they function while the tape cassette is being assembled.)

Furthermore, the reason why there is a difference in level between the curved guide ribs 3092, for deploying the brake pawls 3071 on the lower case 3031, and the linear guide ribs 3091 (or in other words, why the curved guide ribs 3092 are taller than the linear guide ribs 3091) is because the brake pawls 3071 can be securely deployed. Even if the brake member performs an oscillating action when the reel brake member 317 is assembled, the root of the brake pawl 3071 (in the vicinity of the hinge portion 3072) is brought into abutment with the stepped portion rearward of the curved guide ribs 3092 and thus, the stepped portion is useful in regulating the reel brake member 317 such that no unnecessary oscillating movements are performed.

In the drawings, reference numeral 320 denotes a spring for pressingly supporting the tape reels 302. Reference numerals 321, 322, 323, and 324 denote a lid lock, a plug, an MIC detecting portion, and an optical cover, respectively.

In another embodiment shown in FIGS. 28A to 30B, as with the previous embodiment, the reel brake member 317 is constructed as a brake mechanism comprising arms 307 via hinge portions 3072, which arms 307 each have a brake pawl 3071 formed at a distal end thereof, arm portions 3075 provided on external surfaces of the arms 307 in such a manner as to protrude therefrom so as to replace one of the projections 3073, 3074 (more particularly, projection 3073), and constructed so as to correspond to outer circumferential ribs on the partition wall 3101 formed on the lower case 3031 for abutment and locking. As to the other constructions of the reel brake member 317 of this embodiment, like reference numerals are given to portions like to those described in the previous embodiment, and a description thereof will be omitted.

Figure 30A:
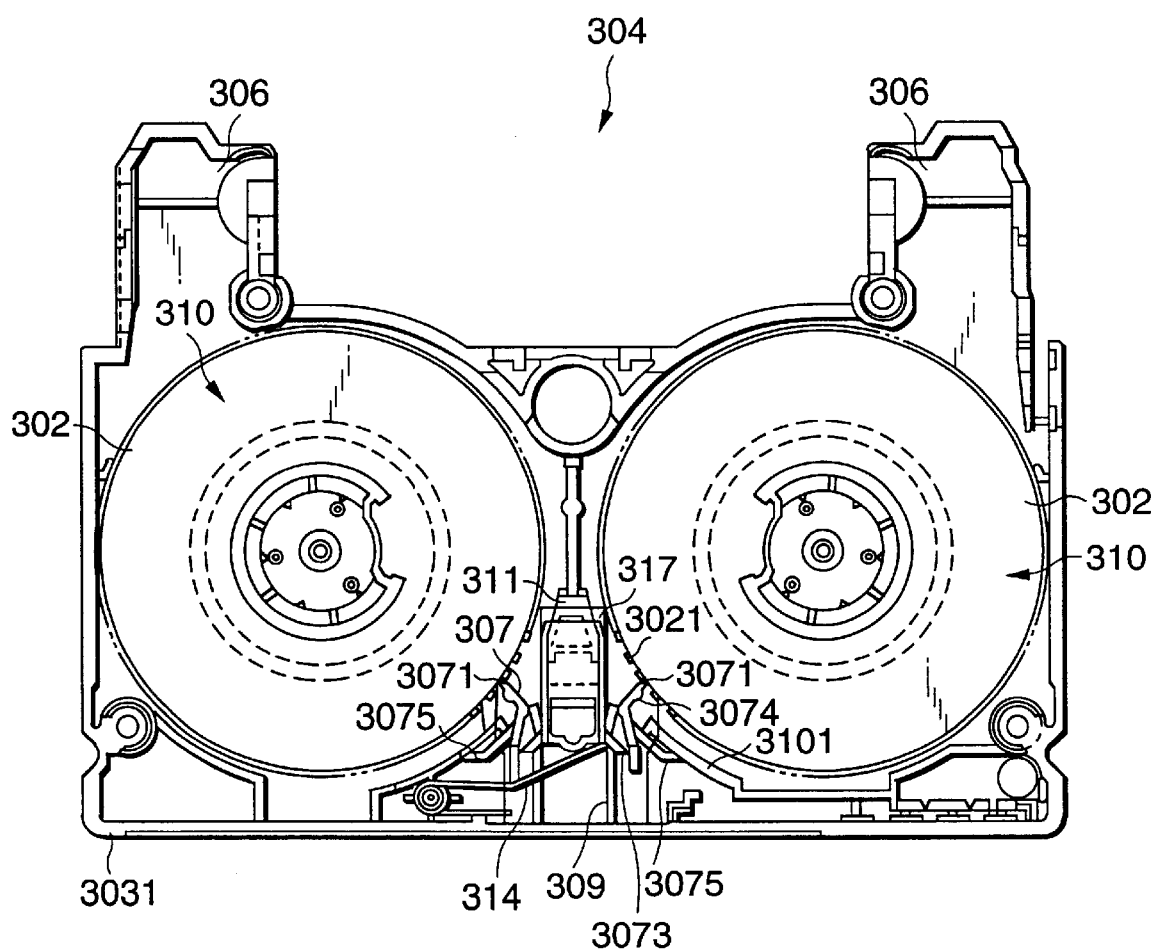
FIGS. 30A and 30B are views showing operational condition in which the reel brake member as shown in FIGS. 28A and 28B.
Figure 30B:
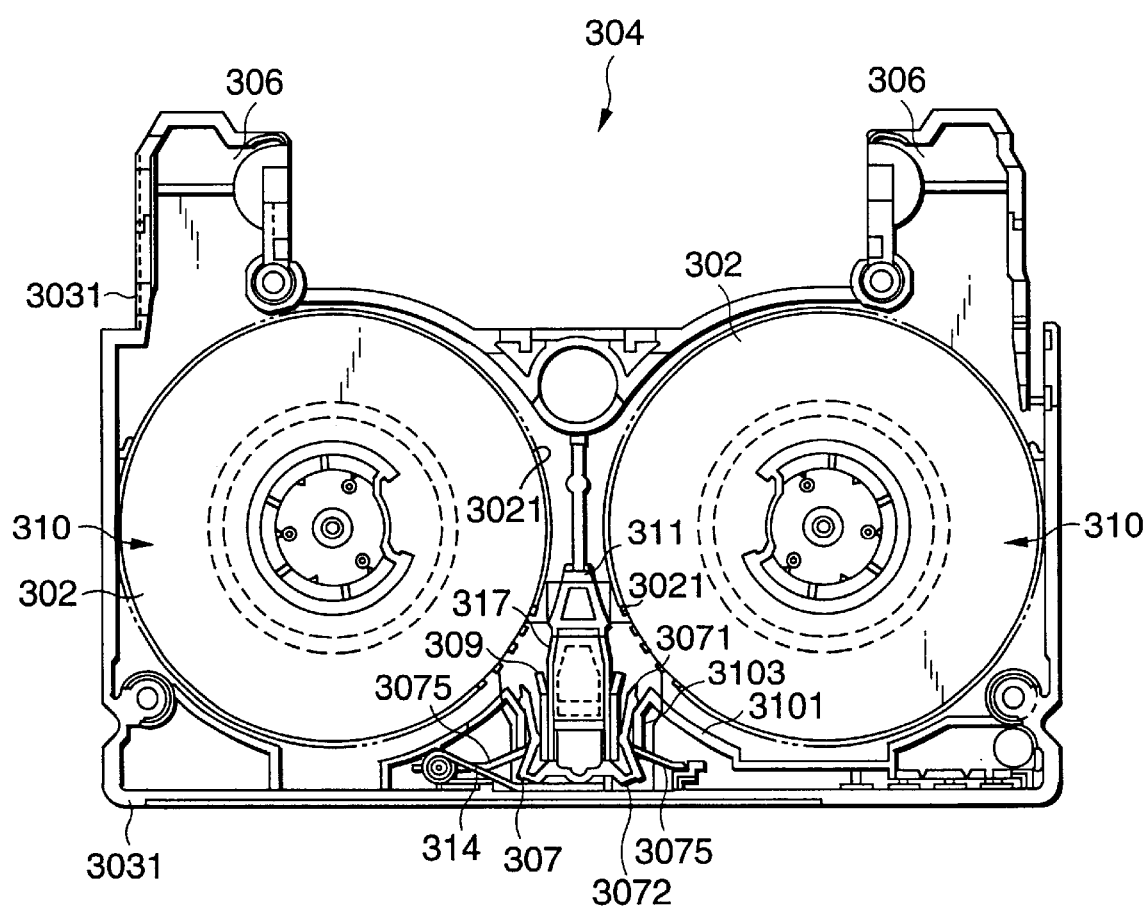
Figure 31A:
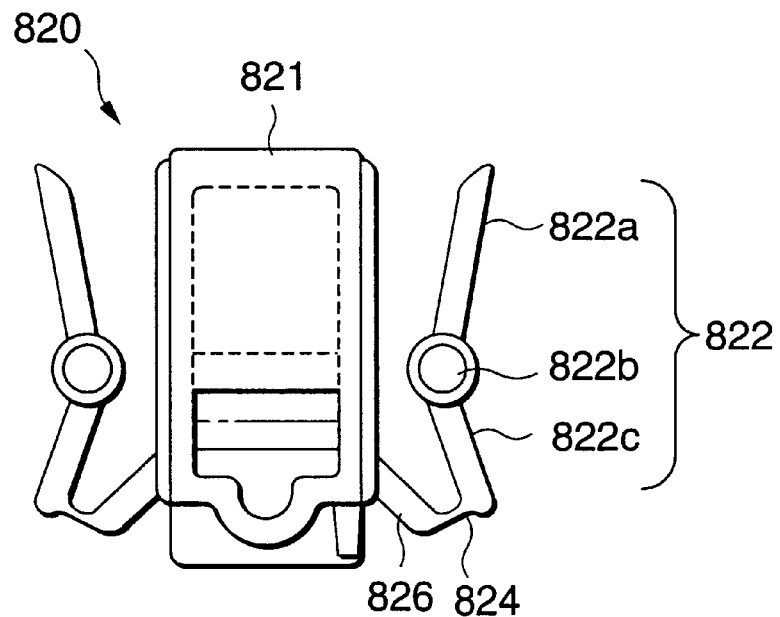
FIGS. 31A and 31B are plan views showing an example of a conventional reel brake for a tape cassette.
Figure 31B:
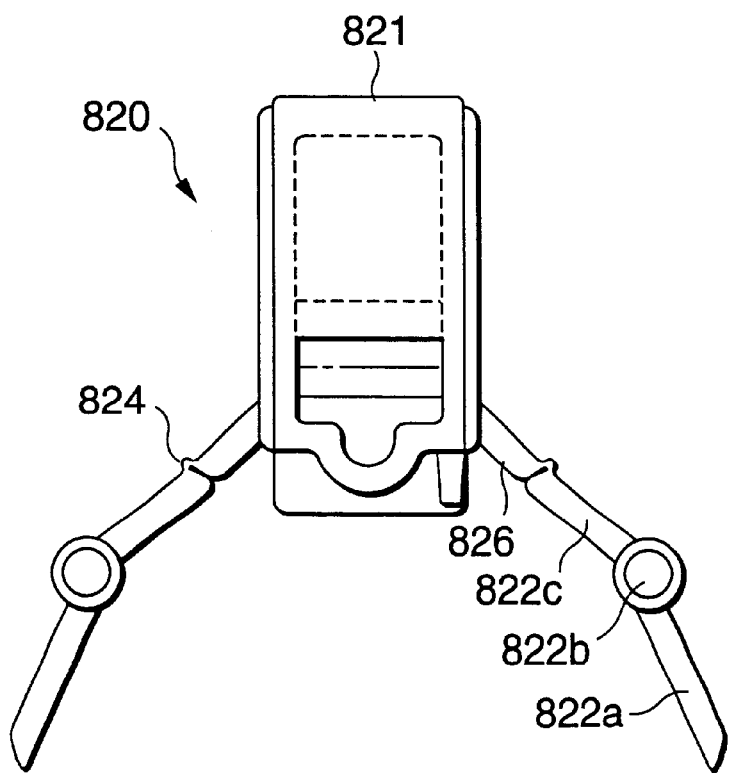
Figure 32A:
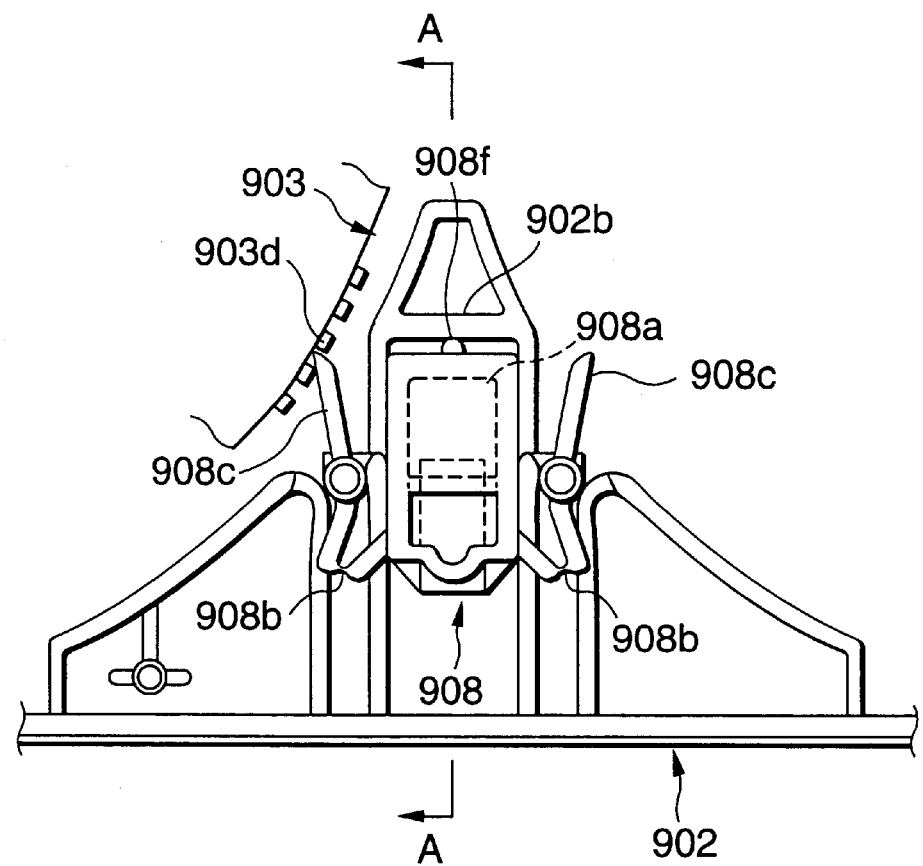
FIGS. 32A and 32B are views showing an example of a conventional reel brake.
Figure 32B:
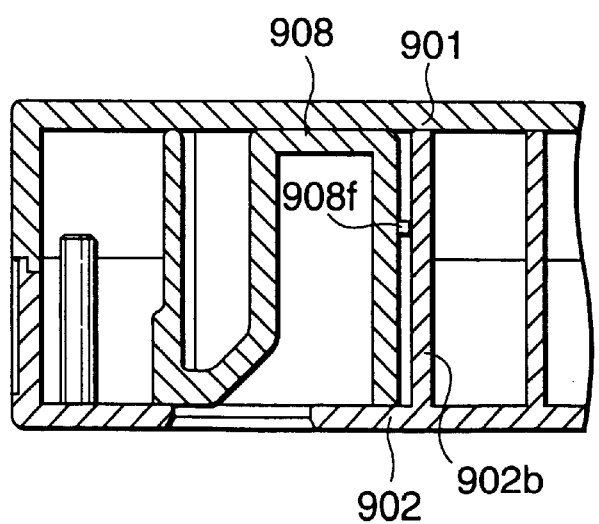

In this case, as shown in FIG. 30A, when the brake is in operation, the arm portions 3075 are brought into abutment with outer circumferential ribs on the partition wall 3101, and the brake pawls 3071 securely engage the teeth 3021 of the tape reels 302, whereby a highly reliable brake mechanism is provided which is difficult to disengage. In releasing the brake (FIG. 30B), even when the reel brake member 317 moves rearward, the arm portions 3075 disengage from the outer circumferential ribs 3101, and the brake pawls 3071 quickly separate from the teeth 3021. Furthermore, the projections 3073 of the arms 307 abut with and act on the regulating wall portions 309 so that the arms 307 can operate smoothly for the following operation of the reel brake member 317, whereby the free rotational operation of the tape reels 302 can be secured.

In addition, the regulating wall portions 309 on the lower case 3031 guide the projections 3073 provided on the arms 307 of the reel brake member 317 so as to securely regulate the position of the reel brake member 317 at the rear portion thereof.

The present invention provides a tape cassette comprising a pair of tape reels around which a tape is wound rotatably received in a case, the tape being disposed so as to extend from one of the tape reels through a front of the case to the other tape reel to be wound up therearound, and a reel brake member having brake pawls for suppressing the rotation of the tape reels and provided so as to freely slide for engagement with and disengagement from teeth of the tape reels for braking operation and brake releasing operation, respectively, the reel brake member being biased by a spring toward a tape reels side, wherein a main body of the reel brake member comprises arms provided on sides thereof via hinge portions, each of the arms having a brake pawl provided on a distal end thereof, an opening hole portion formed therein for insertion of a brake release operating member provided on a device side, upper and lower surface portions adapted to abut with and slide over internal surfaces of upper and lower cases, recessed portions provided on sides of a front side of the upper surface portion at positions corresponding to outer circumferential edges of the tape reels, and a butt recessed portion formed on a front side of the lower surface portion in such a manner as to correspond to holding ribs provided on a front side of a reel brake sliding area of the lower case along a tape reel receiving area. With this construction, the reel brake member that is biased by virtue of a resilient force inside the case so as to engage the tape reels is restricted and regulated to the extent that the engagement of the brake pawls of the reel brake member is disengaged when the tape cassette is not in use with respect to the movable range of the reel brake, and even if an external force from a strong impact such as a drop impact is exerted, the reel brake is prevented from being disengaged, and the production of a looseness of the tape can be prevented. Moreover, even if the tape reels are moved within the tape cassette, since there is no chance for the flanges of the tape reels to abut with the reel brake member main body, there is no risk of the brake being moved by the flanges, thereby making it possible to eliminate unnecessary movements of the reel brake for secure engagement. In addition, since the reel brake member can rotate (oscillate) at the brake position so as to meet the movements of the supply side and wind-up side tape reels, the reel brake member can follow every movement of the tape reels, whereby a highly reliable reel brake can be provided. Thus, this helps prevent the generation of tape damage due to a cassette failure when the cassette is mounted in the recording and reproducing device. In addition, with this construction in which a limited number of components are involved, a highly reliable tape cassette can be obtained which is free of deformation and damage, which is superior in assembling capability and which can markedly improve the productivity, thus helping reduce the costs of the tape cassettes so produced.

What is claimed is:

1. A tape cassette comprising:
    a case main body;
    a pair of tape reels around which a tape is wound rotatably received in said case main body;
    a reel brake for preventing idle rotations of said tape reels through engagement with said tape reels when said tape cassette is not in use, said reel brake including:
        a pair of pawls each having a thinned hinge portion, wherein each of said pawls is rotatable through said hinge portion;
        a regulating portion for preventing excessive rotations of said pawl;
        upper and lower surface portions adapted to abut with and slide over internal surfaces of upper and lower cases;
        recessed portions provided on sides of a front side of said upper surface portion at positions corresponding to outer circumferential edges of said tape reels; and
        a butt recessed portion formed on a front side of said lower surface portion in such a manner as to correspond to holding ribs provided on a front side of a reel brake sliding area of said lower case along a tape reel receiving area.

2. A tape cassette comprising:
    a case;
    a pair of tape reels around which a tape is wound rotatably received in a case, said tape being disposed so as to extend from one of said tape reels through a front of said case to the other tape reel to be wound up therearound;
    a reel brake member having brake pawls for suppressing the rotation of said tape reels and provided so as to freely slide for engagement with and disengagement from teeth of said tape reels for braking operation and brake releasing operation, respectively; and
    a spring for biasing said reel brake member toward said tape reels,
    wherein said reel brake member comprises arms provided on sides thereof via hinge portions, each of said arms having a brake pawl provided on a distal end thereof, an opening hole portion formed therein for insertion of a brake release operating member provided on a device side, upper and lower surface portions adapted to abut with and slide over internal surfaces of upper and lower cases, recessed portions provided on sides of a front side of said upper surface portion at positions corresponding to outer circumferential edges of said tape reels, and a butt recessed portion formed on a front side of said lower surface portion in such a manner as to correspond to holding ribs provided on a front side of a reel brake sliding area of said lower case along a tape reel receiving area.

3. A tape cassette as set forth in claim 2, wherein a regulating wall portion for regulating the sliding of said arm of said reel brake member is a guide rib, said guide rib comprising a linear guide rib oriented toward a back side of said case and a curved guide rib provided on a front side of said case so as to extend outwardly, said linear guide rib and said curved guide rib being provided on internal surfaces of said upper and lower cases in such a manner as to protrude therefrom.

4. A tape cassette as set forth in claim 3, wherein said curved guide rib is provided so as to extend at a height which is taller than said linear guide rib.

5. A tape cassette as set forth in claim 2, wherein a projection is provided on said arm of said reel brake member in such a manner as to protrude therefrom for abutment with said guide rib.

6. A tape cassette as set forth in claim 2, wherein guide wall portions which said arms of said reel brake member slide along and abut with are provided continuously with outer circumferential ribs provided along said tape reels receiving area.

7. A tape cassette as set forth in claim 2, wherein said holding ribs are provided at a substantially central position between said tape reel receiving areas on the lower case in such a manner as to protrude therefrom, whereby said ribs are provided so as to be connected to said position regulating ribs provided on said lower case in such a manner as to protrude therefrom.

* * * * *